United States Patent
Yamakawa et al.

(10) Patent No.: US 12,490,945 B2
(45) Date of Patent: Dec. 9, 2025

(54) X-RAY IMAGING APPARATUS AND OPERATION METHOD OF X-RAY IMAGING APPARATUS

(71) Applicant: FUJIFILM Healthcare Corporation, Chiba (JP)

(72) Inventors: Keisuke Yamakawa, Chiba (JP); Kazuki Matsuzaki, Chiba (JP); Isao Takahashi, Chiba (JP); Tadashi Nakamura, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 186 days.

(21) Appl. No.: 18/418,321

(22) Filed: Jan. 21, 2024

(65) Prior Publication Data

US 2024/0245366 A1    Jul. 25, 2024

(30) Foreign Application Priority Data

Jan. 23, 2023  (JP) ................. 2023-008131

(51) Int. Cl.
  *A61B 6/40*  (2024.01)
  *A61B 6/00*  (2006.01)

(52) U.S. Cl.
  CPC .......... *A61B 6/4007* (2013.01); *A61B 6/4021* (2013.01); *A61B 6/5217* (2013.01); *A61B 6/542* (2013.01)

(58) Field of Classification Search
  CPC ....... A61B 6/4452; A61B 6/482; A61B 6/032; A61B 6/4007; A61B 6/4071; A61B 6/486;

(Continued)

(56) References Cited

U.S. PATENT DOCUMENTS 6,097,788 A * 8/2000 Berenstein ............... H05G 1/70
                                                                    378/92

FOREIGN PATENT DOCUMENTS

| JP | 2020099583 | 7/2020 |
|----|------------|--------|
| JP | 2021053268 | 4/2021 |
| JP | 2021133036 | 9/2021 |

* cited by examiner

*Primary Examiner* — Don K Wong
(74) *Attorney, Agent, or Firm* — JCIPRNET

(57) ABSTRACT

Provided is an X-ray imaging apparatus including two tubes, the X-ray imaging apparatus having a smaller exposure amount of a subject than a biplane X-ray imaging apparatus, maintaining an image quality of an X-ray image in a time axis direction, and improving the visibility of a device or the like.

A first X-ray tube that irradiates the subject with X-rays, a second X-ray tube that irradiates the subject with X-rays from a direction different from a direction of the first X-ray tube, and one X-ray detector that detects the X-rays that are applied from the first X-ray tube and the second X-ray tube and are transmitted through the subject are provided. Pulse-like power is alternately supplied to the first X-ray tube at a first pulse width and to the second X-ray tube at a second pulse width such that a period in which the first X-ray tube applies the X-rays and a period in which the second X-ray tube applies the X-rays do not overlap with each other. A first X-ray image is generated by taking in output of the X-ray detector that has detected the X-rays applied from the first X-ray tube. A second X-ray image is generated by taking in output of the X-ray detector that has detected the X-rays applied from the second X-ray tube.

10 Claims, 20 Drawing Sheets

(58) Field of Classification Search
CPC ............ A61B 6/4085; A61B 2090/376; A61B 2090/3762; A61B 6/56
See application file for complete search history.

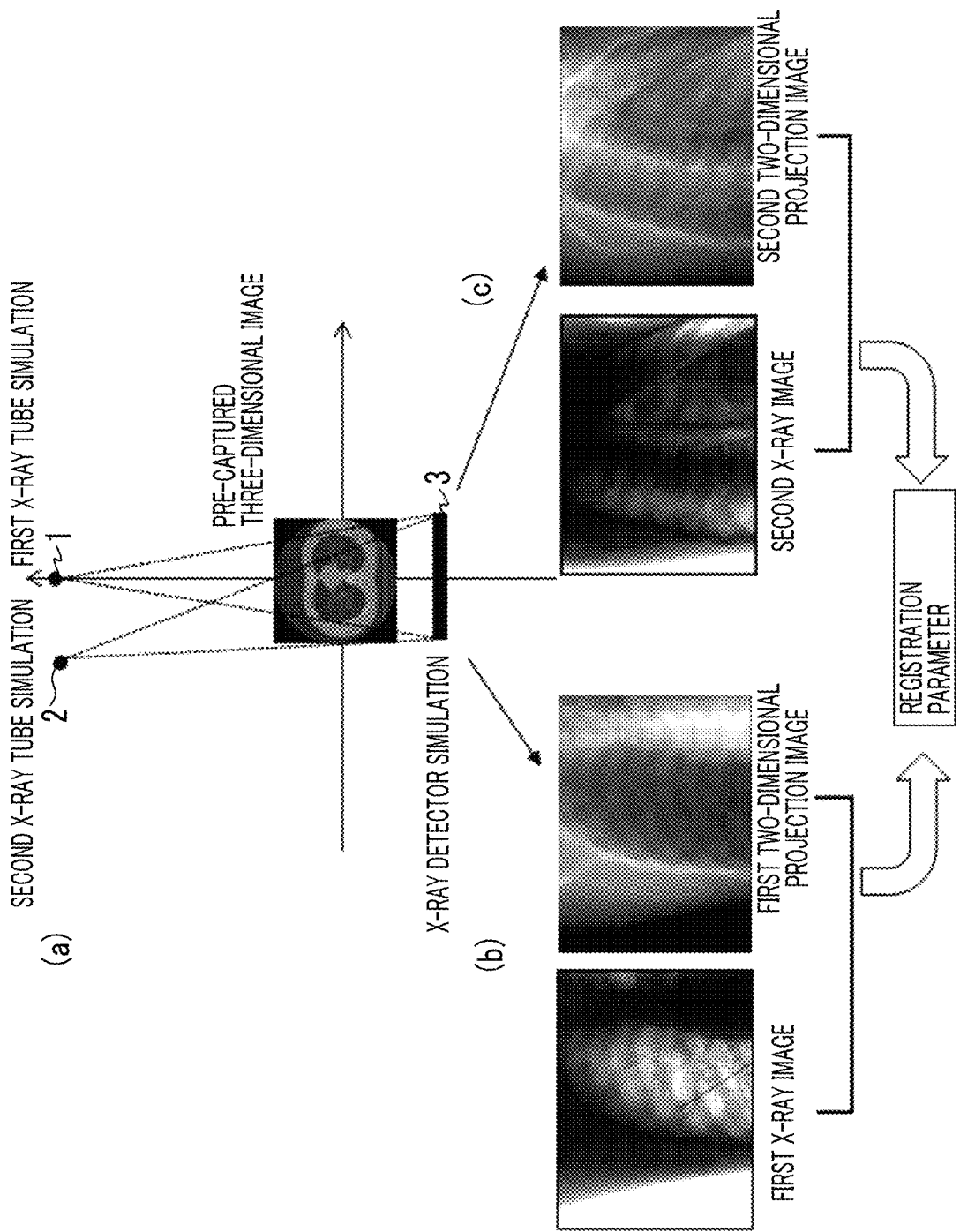

X-RAY IMAGING APPARATUS AND OPERATION METHOD OF X-RAY IMAGING APPARATUS

INCORPORATION BY REFERENCE

The present application claims priority from Japanese patent application JP-2023-008131 filed on Jan. 23, 2023, the content of which is hereby incorporated by reference into this application.

BACKGROUND OF THE INVENTION

1. Field of the Invention

The present invention relates to an X-ray imaging apparatus, and more particularly to an X-ray imaging apparatus comprising two tubes.

2. Description of the Related Art

A general X-ray imaging apparatus performs X-ray imaging of a still image or X-ray imaging (so-called fluoroscopy) of a moving image by continuous imaging by irradiating a subject with X-rays from one X-ray tube to detect the X-rays transmitted through the subject by one planar X-ray detector.

JP2021-53268A discloses a technique of applying X-rays a plurality of times from one X-ray tube and optimizing a second X-ray irradiation condition based on a detection result of first X-ray irradiation. For example, a first X-ray image related to the subject is generated based on an output from the X-ray detector obtained by the first X-ray irradiation, and in a case in which a device region such as a stent and a predetermined part region do not overlap with each other or in a case in which the contrast is low, the X-ray condition (tube voltage, tube current, pulse width of power required for one irradiation time, and the like) is changed so that the dose of the second X-ray irradiation is increased. As a result, the visibility of a device in a fluoroscopic image is improved, the throughput of an examination is improved, and the exposure is reduced.

Further, JP2021-133036A discloses a so-called biplane X-ray imaging apparatus. This X-ray imaging apparatus comprises two X-ray tubes and two X-ray detectors. A configuration is adopted in which a first X-ray tube and a first X-ray detector are disposed to face each other by a first C-type arm, and a second X-ray tube and a second X-ray detector are disposed to face each other by a second C-type arm. Rotation axes of the first C-type arm and the second C-type arm are set to intersect with each other. A three-dimensional image can be obtained by rotating each of the first C-type arm and the second C-type arm to perform imaging. As a result, it is possible to understand a three-dimensional position of the device or the like.

JP2020-99583A discloses a technique of determining disposition of a first C-type arm and a second C-type arm of a biplane X-ray imaging apparatus based on three-dimensional data of a subject imaged in advance.

SUMMARY OF THE INVENTION

As in JP2021-53268A, with an X-ray imaging apparatus that applies the X-rays from the one X-ray tube, it is not possible to understand a position of the subject, such as a device, in a depth direction. Although the position of the device or the like in the depth direction of the subject can be detected by changing the directions of the one X-ray tube and the one X-ray detector and performing two times of imaging, a time difference between the two times of imaging, and it takes a long time to perform the two times of imaging, so that it is not possible to obtain a continuous X-ray image from a certain direction.

On the other hand, as in JP2021-133036A and JP2020-99583A, with the biplane X-ray imaging apparatus using two sets of the X-ray tubes and the X-ray detectors, it is possible to understand the three-dimensional position of the device, but the subject is irradiated with the X-rays from two sets of the X-ray tubes. Therefore, in a case in which the X-ray image having the same image quality as the X-ray image captured by one X-ray tube and one X-ray detector is captured by two sets of the X-ray tubes and the X-ray detectors, it is necessary to irradiate the subject with about double X-ray dose, and the exposure to the subject is large. In addition, as in JP2020-99583A, in a case in which the three-dimensional data of the subject is captured in advance, there is also a problem that the X-ray image captured in real time and the three-dimensional data captured in advance have a large misregistration of the subject.

An object of the present invention is to provide an X-ray imaging apparatus comprising two tubes, the X-ray imaging apparatus having a smaller exposure amount of a subject than a biplane X-ray imaging apparatus, maintaining an image quality of an X-ray image in a time axis direction, and being capable of improving the visibility of a device or the like.

In order to achieve the above object, an aspect of the present invention relates to an X-ray imaging apparatus including a top plate on which a subject is placed, a first X-ray tube that irradiates the subject with X-rays, a second X-ray tube that irradiates the subject with X-rays from a direction different from a direction of the first X-ray tube, an X-ray detector that detects the X-rays that are applied from the first X-ray tube and the second X-ray tube and are transmitted through the subject, an imaging controller, and an image generation unit. The imaging controller alternately supplies pulse-like power to the first X-ray tube at a first pulse width and to the second X-ray tube at a second pulse width such that a period in which the first X-ray tube applies the X-rays and a period in which the second X-ray tube applies the X-rays do not overlap with each other. The image generation unit generates a first X-ray image by taking in output of the X-ray detector that has detected the X-rays applied from the first X-ray tube, and generates a second X-ray image by taking in output of the X-ray detector that has detected the X-rays applied from the second X-ray tube.

According to the aspect of the present invention, it is possible to provide the X-ray imaging apparatus comprising two tubes, the X-ray imaging apparatus having the smaller exposure amount of the subject than the biplane X-ray imaging apparatus, maintaining the image quality of the X-ray image in the time axis direction, and being capable of improving the visibility of the device or the like.

BRIEF DESCRIPTION OF THE DRAWINGS

FIG. 20 is a diagram showing a principle of 3D mapping of the X-ray imaging apparatus according to Embodiment 4.

DESCRIPTION OF THE PREFERRED EMBODIMENTS

Hereinafter, embodiments of the present invention will be described with reference to the accompanying drawings.

Embodiment 1

A configuration of an X-ray imaging apparatus 100 according to Embodiment 1 will be described.

Figure 1:
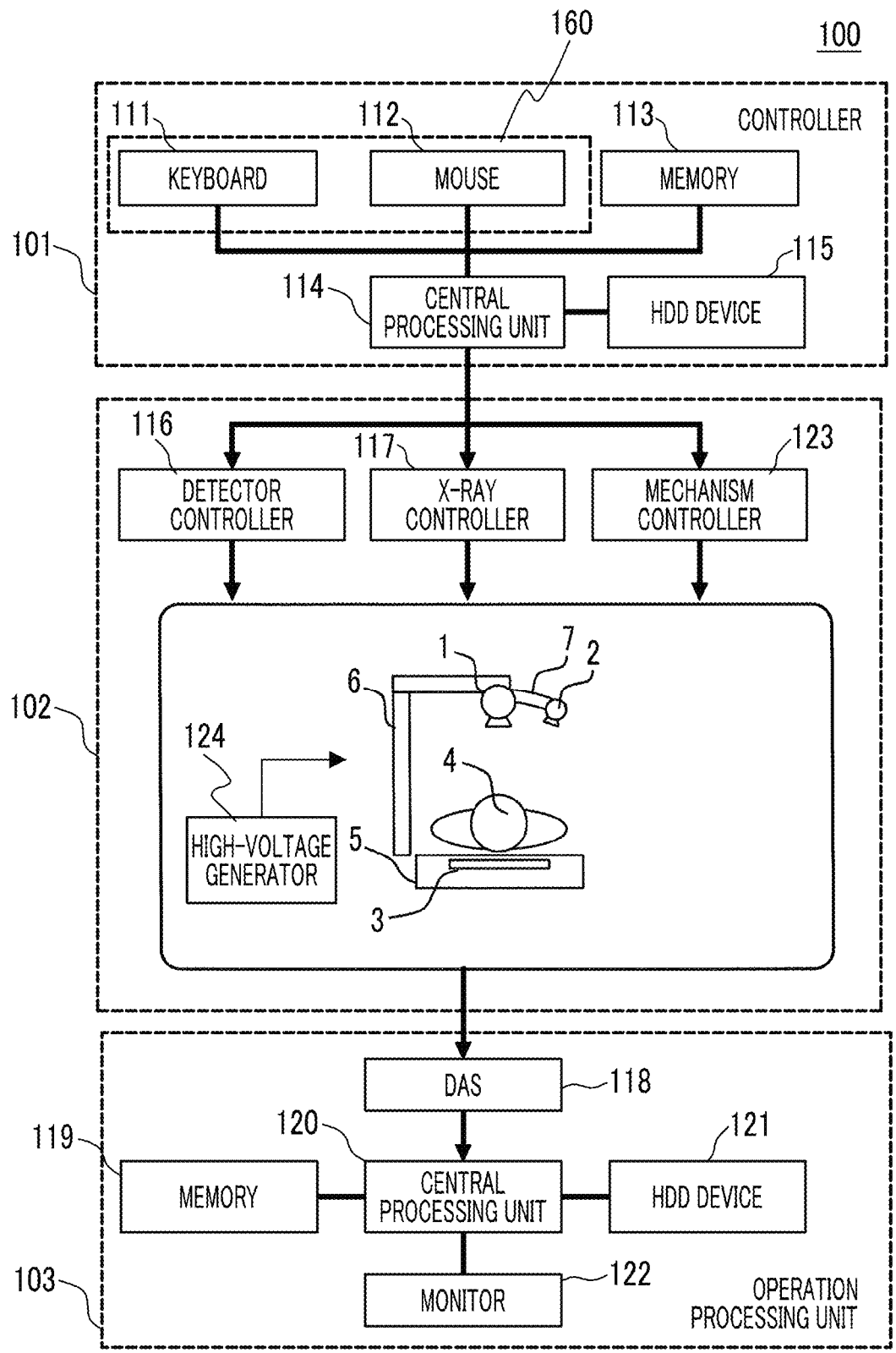
FIG. 1 is a block diagram showing a hardware configuration of an X-ray imaging apparatus 100 according to Embodiment 1 of the present invention.
Figure 2:
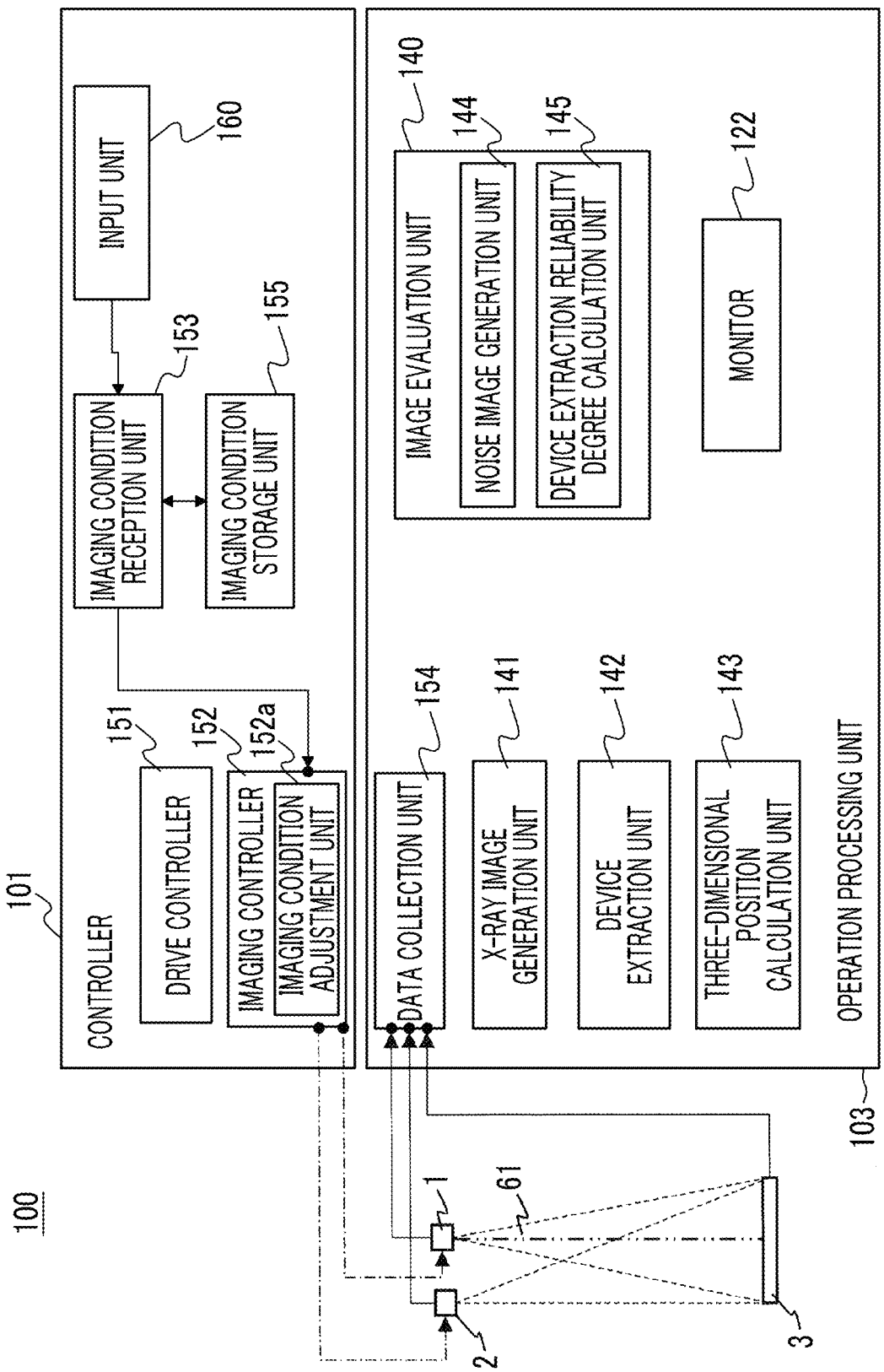
FIG. 2 is a functional block diagram of a controller 101 and an operation processing unit 103 of the X-ray imaging apparatus 100 according to Embodiment 1.

FIG. 1 is a block diagram showing a hardware configuration of the X-ray imaging apparatus 100. FIG. 2 is a functional block diagram of a controller 101 and an operation processing unit 103 of the X-ray imaging apparatus 100.

As shown in FIG. 1, the X-ray imaging apparatus 100 comprises a top plate 5 on which a subject 4 is placed, and a first X-ray tube 1 that irradiates the subject 4 with X-rays, and a second X-ray tube 2. The second X-ray tube 2 irradiates the subject 4 with X-rays from a direction different from a direction of the first X-ray tube 1. The first X-ray tube 1 is supported by a first support portion 6. The second X-ray tube 2 is supported by a second support portion 7. The X-rays applied from the first X-ray tube 1 and the second X-ray tube 2 are transmitted through the subject 4. An X-ray detector 3 is disposed in the top plate 5 at a position irradiated with the X-rays transmitted through the subject 4. A high-voltage generator 124 is connected to the first X-ray tube 1 and the second X-ray tube 2. An X-ray controller 117 that controls an operation of a driving unit, such as rotation of an anode, is connected to the first X-ray tube 1 and the second X-ray tube 2. The top plate 5, the first support portion 6, and the second support portion 7 have a built-in drive mechanism, and a mechanism controller 123 that controls the drive mechanism is connected to the top plate 5. A detector controller 116 that controls an operation of the X-ray detector 3 is connected to the X-ray detector 3. These components constitute a main body 102 of the X-ray imaging apparatus 100.

A controller 101 that controls imaging by controlling the operations of the detector controller 116, the X-ray controller 117, and the mechanism controller 123 of the main body 102 is connected to the detector controller 116, the X-ray controller 117, and the mechanism controller 123 of the main body 102. The controller 101 comprises a central processing unit 114, an input unit 160, a memory 113, and a hard disk drive (HDD) device 115. A program or the like executed by the central processing unit 114 is stored in the memory 113 and the HDD device 115. In addition, the input unit 160 includes a keyboard 111 and a mouse 112.

The operation processing unit 103 that collects data output by the X-ray detector 3 and performs processing such as image generation is connected to the X-ray detector 3 of the main body 102. The operation processing unit 103 is connected to a direct attached storage (DAS) 118 that takes in and stores the data output by the X-ray detector 3, a central processing unit 120, a memory 119, an HDD device 121, and a monitor 122. A program or the like executed by the central processing unit 120 is stored in the memory 119 and the HDD device 121.

The central processing unit 114 of the controller 101 reads and executes the program stored in advance in the memory 113 and/or the HDD device 115, thereby realizing functions of a drive controller 151, an imaging controller 152, and an imaging condition reception unit 153 shown in FIG. 2. In addition, the memory 113 and/or the HDD device 115 realizes a function of an imaging condition storage unit 155 of FIG. 2 by software.

The imaging controller 152 controls the high-voltage generator 124 and the X-ray controller 117 so that pulse-like power is alternately supplied to the first X-ray tube 1 at a first pulse width and to the second X-ray tube 2 at a second pulse width such that a period in which the first X-ray tube 1 applies the X-rays and a period in which the second X-ray tube 2 applies the X-rays do not overlap with each other.

The imaging condition storage unit 155 stores in advance patterns of the pulses of the power supplied to the first X-ray tube 1 and the second X-ray tube 2 for each imaging mode (normal imaging mode and high-speed device imaging mode).

The central processing unit 120 of the operation processing unit 103 reads and executes the program stored in advance in the memory 119 and/or the HDD device 121, thereby realizing functions of a data collection unit 154, an X-ray image generation unit 141, a device extraction unit 142, a three-dimensional position calculation unit 143, and an image evaluation unit 140 shown in FIG. 2 by software.

Figure 5:
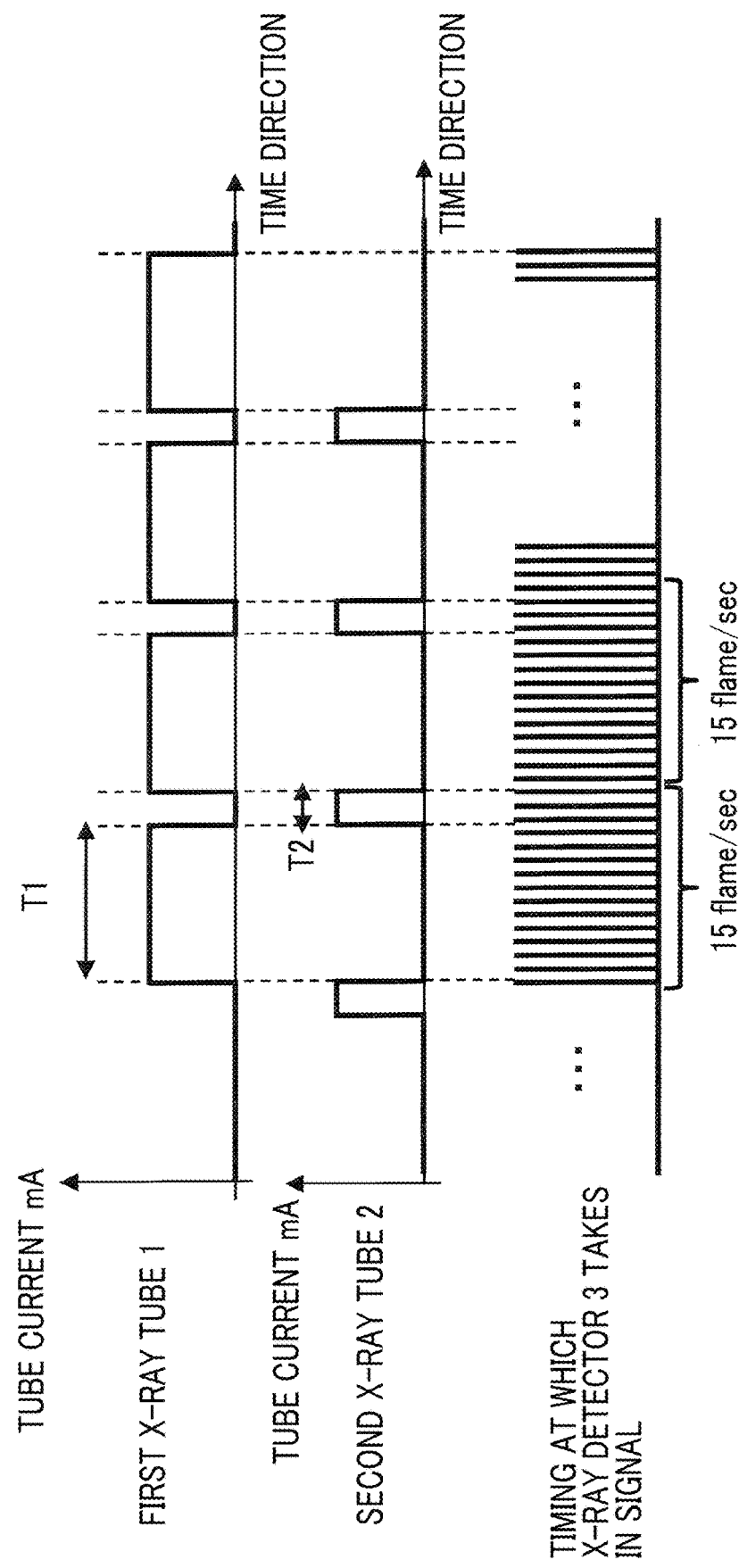
FIG. 5 is a timing chart showing a pulse shape of power supplied to a first X-ray tube 1 and a second X-ray tube 2 by the controller 101 of the X-ray imaging apparatus 100 according to Embodiment 1 in a normal imaging mode, and a timing at which the operation processing unit 103 takes in a signal from an X-ray detector 3.
Figure 6:
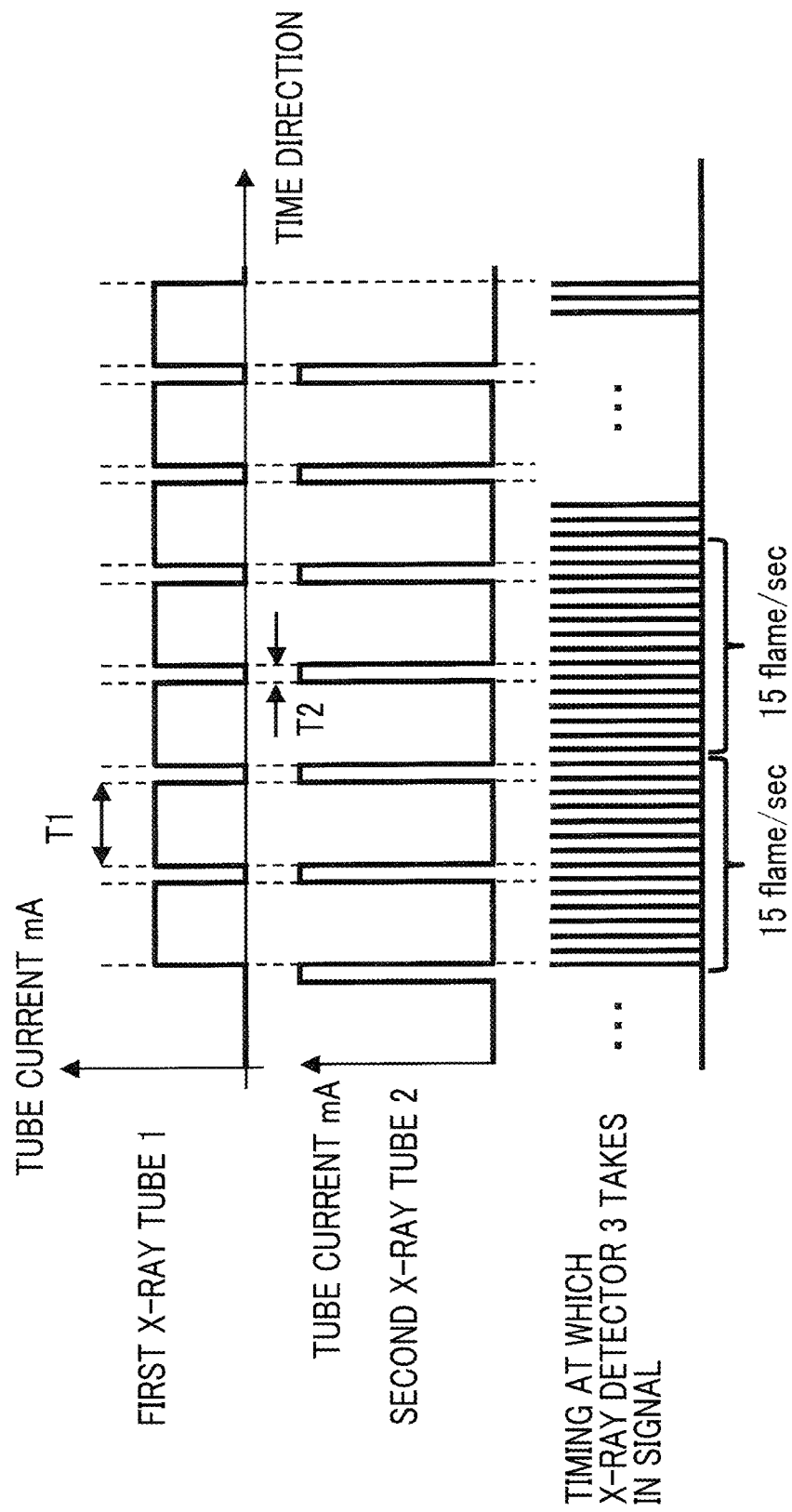
FIG. 6 is a timing chart showing a pulse shape of power supplied to a first X-ray tube 1 and a second X-ray tube 2 by the controller 101 of the X-ray imaging apparatus 100 according to Embodiment 1 in a high-speed device imaging mode, and the timing at which the operation processing unit 103 takes in the signal from an X-ray detector 3.

The data collection unit 154 takes in a signal output by X-ray detection elements two-dimensionally arranged in the X-ray detector 3 in response to the irradiation with the X-rays at a timing shown in FIG. 5 or 6.

The X-ray image generation unit 141 generates a first X-ray image by receiving, from the data collection unit 154, the signal output from the X-ray detector 3 that receives the X-rays applied from the first X-ray tube 1. In addition, the X-ray image generation unit 141 generates a second X-ray image by receiving, from the data collection unit 154, the signal output from the X-ray detector 3 that receives the X-rays applied from the second X-ray tube 2.

The device extraction unit 142 performs image processing on each of the first X-ray image and the second X-ray image by a known method, and extracts an image of a distal end of a device included in the image.

The three-dimensional position calculation unit 143 calculates a three-dimensional position of the distal end of the device from the position of the distal end of the device in the first X-ray image and the second X-ray image.

The image evaluation unit 140 includes a noise image generation unit 144 and a device extraction reliability degree calculation unit 145. The noise image generation unit 144 generates a noise image showing a distribution of noise in the image by performing image processing on each of the first X-ray image and the second X-ray image. The device extraction reliability degree calculation unit 145 calculates a reliability degree of the device extracted by the device extraction unit 142.

The controller 101 and the operation processing unit 103 can also realize a part or all of the above-described units by hardware. For example, a circuit need only be designed to realize the function of each unit by using a custom IC such as an application specific integrated circuit (ASIC) or a programmable IC such as a field-programmable gate array (FPGA).

The detailed function of each unit of the controller 101 and the operation processing unit 103 will be clarified in the description of an operation of the X-ray imaging apparatus 100.

A doctor images the subject 4 and the distal end of the device with the X-ray imaging apparatus 100 while inserting the device such as a catheter into the subject 4. An operation of each unit of the X-ray imaging apparatus 100 in this case will be described with reference to FIGS. 3 to 7.

Figure 3:
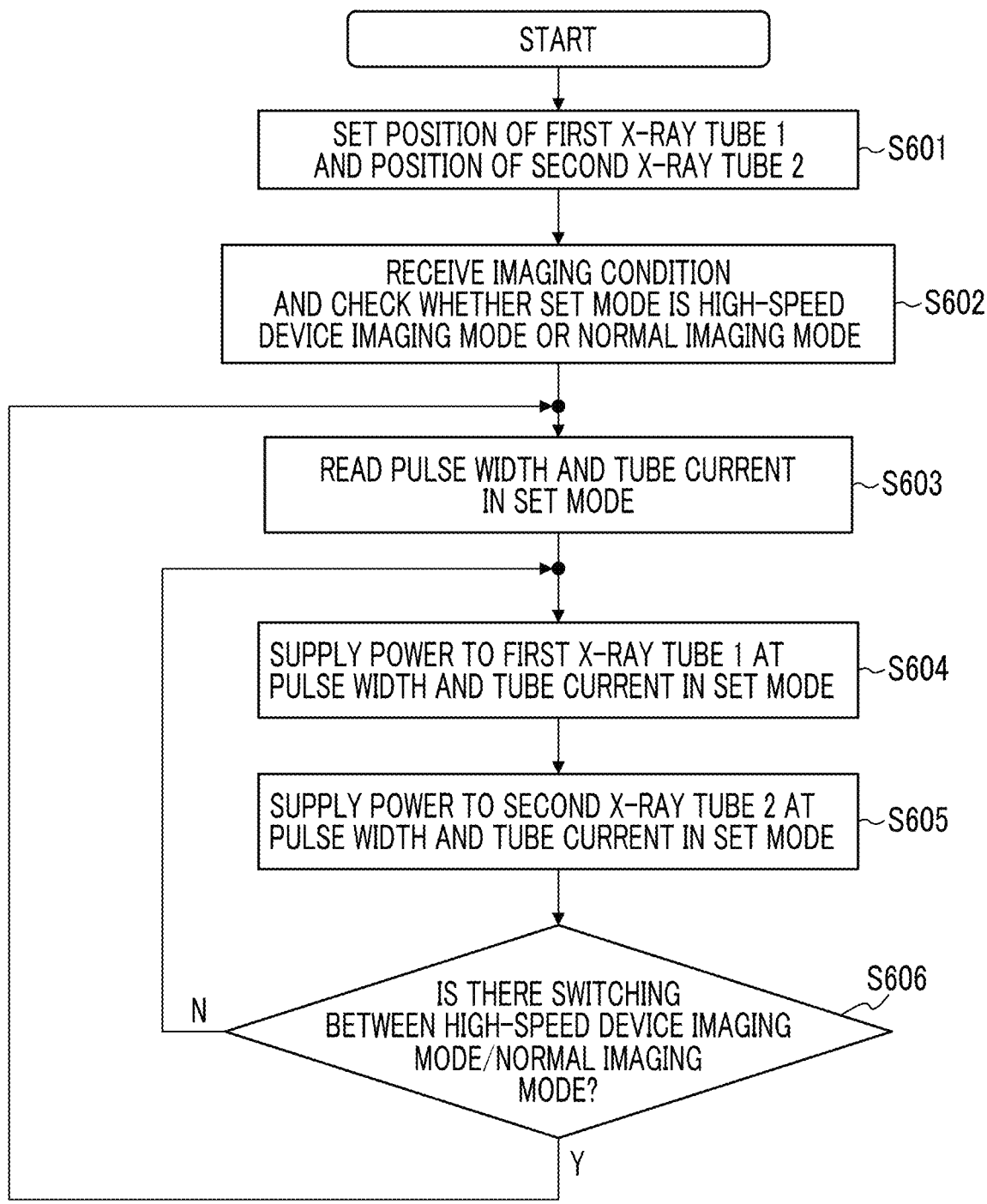
FIG. 3 is a flowchart showing an operation of the controller 101 of the X-ray imaging apparatus 100 according to Embodiment 1.
Figure 4:
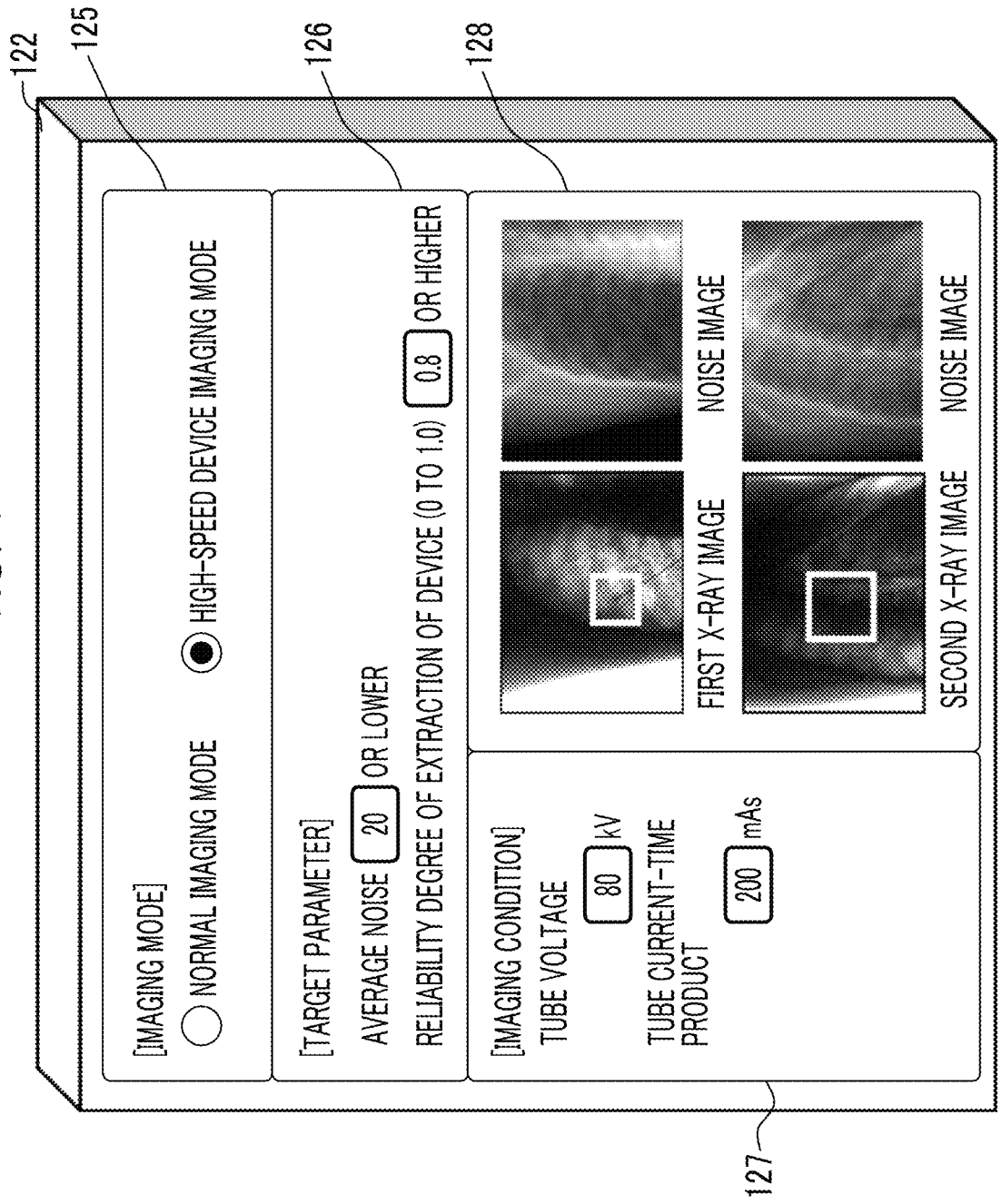
FIG. 4 is a diagram showing an example of a display screen in which the controller 101 of the X-ray imaging apparatus 100 according to Embodiment 1 receives an imaging condition from a user, and the operation processing unit 103 displays an imaging result.
Figure 7:
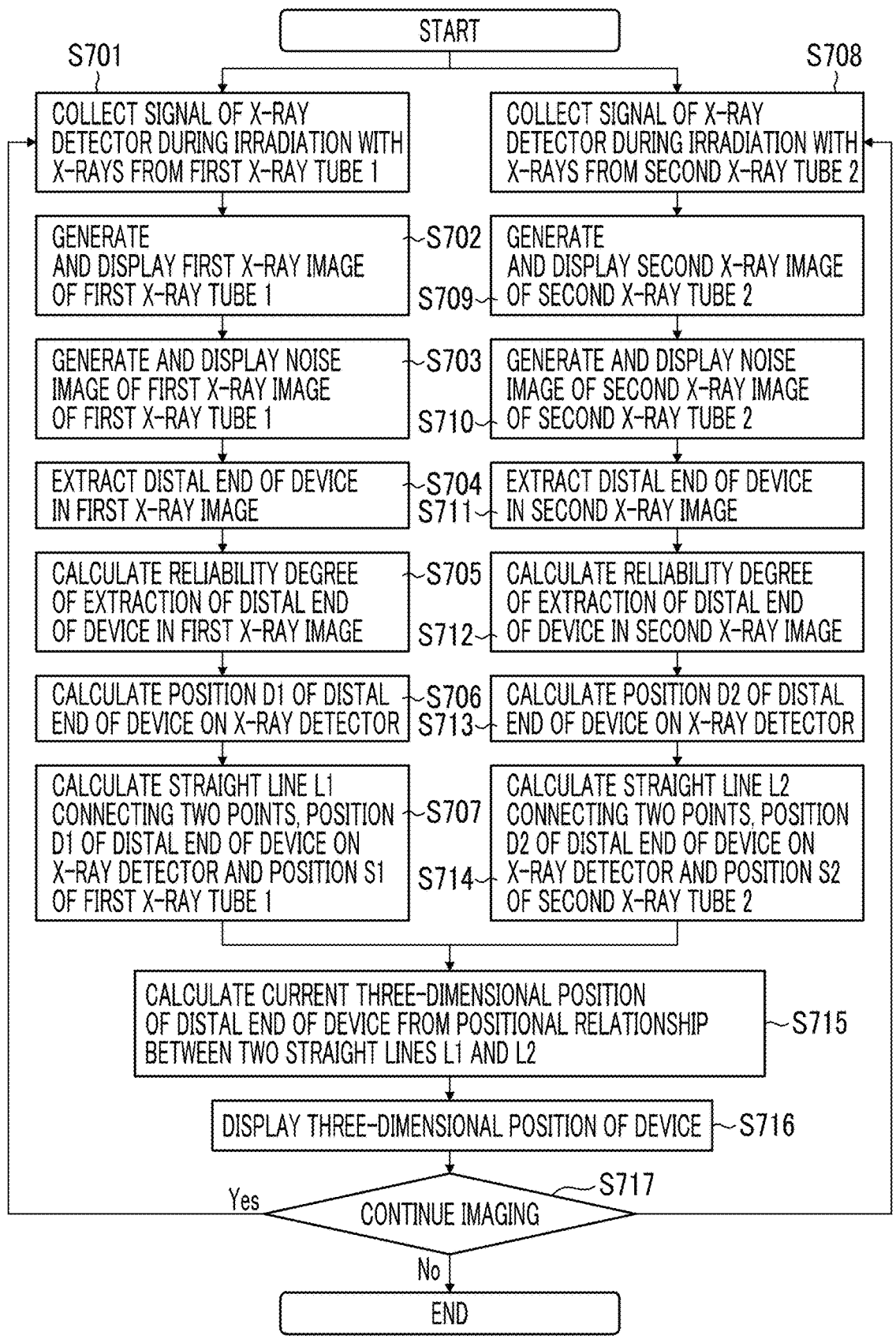
FIG. 7 is a flowchart showing an operation of the operation processing unit 103 of the X-ray imaging apparatus 100 according to Embodiment 1.

FIG. 3 is a flowchart showing an operation of the controller 101. FIG. 4 shows an example of a display screen in which the controller 101 receives an imaging condition from the user and the operation processing unit 103 displays an imaging result. FIGS. 5 and 6 show the pulse shapes of the power supplied to the first X-ray tube 1 and the second X-ray tube 2 in the normal imaging mode and the high-speed device imaging mode, respectively, and a timing at which the signal is taken in from the X-ray detector 3. FIG. 7 is a flowchart showing an operation of the operation processing unit 103.

First, an operation of each unit of the controller 101 will be described with reference to FIG. 3.

Step S601

The user such as the doctor places the subject 4 on the top plate 5. Also, the user sets the positions of the first X-ray tube 1 and the second X-ray tube 2 via the input unit 160.

In step S601, the drive controller 151 operates the drive mechanism built in the first support portion 6 and the second support portion 7, and to dispose the first X-ray tube 1 and the second X-ray tube 2 at positions set by the user.

As a result, the first X-ray tube 1 is disposed at a position at which a target part of the subject 4 into which the device is inserted can be irradiated with the X-rays and the X-rays transmitted through the subject 4 reach the X-ray detector 3. In addition, the second X-ray tube 2 is disposed at a position at which the target part of the subject 4 can be irradiated with the X-rays from the direction different from the direction of the first X-ray tube 1 and the X-rays transmitted through the subject 4 reach the X-ray detector 3.

Step S602

In step S602, the imaging condition reception unit 153 displays an input screen of FIG. 4 on the monitor 122, and receives the input of the imaging mode, a target parameter, and the imaging condition from the user. The imaging condition reception unit 153 checks whether the mode input to an imaging mode reception region 125 on the input screen is the "normal imaging mode" or the "high-speed device imaging mode" (step S602).

Specifically, the input screen of FIG. 4 includes the imaging mode reception region 125, a target parameter input region 126, an imaging condition input region 127, and an image display region 128. The imaging condition reception unit 153 receives the input from the user via the input unit 160 on the input screen of FIG. 4.

The imaging mode reception region 125 is a region for the user to select any one of the "normal imaging mode" or the "high-speed device imaging mode" as the imaging mode. The normal imaging mode is a mode suitable for imaging in a case in which the device is moved in the subject at a normal speed. The high-speed device imaging mode is a mode suitable for imaging in a case in which the device is moved in the subject at high speed.

The target parameter input region 126 is a region for the user to input a target value of an average noise which is an average value of the noise included in the captured image and a target value of a device extraction reliability degree in a case in which the distal end of the device is extracted from the captured image, as the target parameters.

The imaging condition input region 127 is a region for the user to input tube voltages of the first X-ray tube 1 and the second X-ray tube 2, and a tube current-time product. Here, the tube voltages of the first X-ray tube 1 and the second X-ray tube 2 are the same.

The image display region 128 is a region for displaying the X-ray image generated by the operation processing unit 103, and will be described later.

Step S603

The imaging condition reception unit 153 reads the patterns (tube current and pulse width) of the pulses of the power of the first X-ray tube 1 and the second X-ray tube 2, the patterns corresponding to the imaging mode (normal imaging mode or high-speed device imaging mode) received in step S602, from the imaging condition storage unit 155.

The imaging condition storage unit 155 stores, as the normal imaging mode, the patterns (tube current and pulse width) of the pulses of the power supplied to the first X-ray tube 1 and the second X-ray tube 2 shown in FIG. 5 and a timing at which the operation processing unit 103 takes in the signal of the X-ray detector 3. In addition, as the high-speed device imaging mode, the patterns (tube current and pulse width) of the pulses of the power supplied to the first X-ray tube 1 and the second X-ray tube 2 shown in FIG. 6 and a timing at which the operation processing unit 103 takes in the signal of the X-ray detector 3 are stored.

In both imaging modes, a first pulse width T1 of the pulse at which the power is supplied to the first X-ray tube 1 is larger than a second pulse width T2 at which the power is supplied to the second X-ray tube 2, and a setting is performed such that a plurality of time-series images at a predetermined frame rate can be generated during a period in which the first X-ray tube 1 applies the X-rays at the first pulse width.

At least one of the first pulse width T1 of the pulse at which the power is supplied to the first X-ray tube 1 or the tube current value of the pulse at which the power is supplied to the second X-ray tube 2 is different between the normal imaging mode and the high-speed device imaging mode. In the patterns of the pulses of FIGS. 4 and 5, the first pulse width T1 is smaller and the tube current value of the pulse at which the power is supplied to the second X-ray tube 2 is larger in the high-speed device imaging mode than in the normal imaging mode. By reducing the first pulse width T1, even in a case in which a frequency of the irradiation with the X-rays from the second X-ray tube 2 is higher and the movement speed of the device inserted into the subject 4 is higher in the high-speed device imaging mode than in the normal imaging mode, the position can be frequently specified by the image of the X-rays applied from the second X-ray tube 2. In addition, since the tube current value of the second X-ray tube 2 is large, it is possible to capture the image of the device having a high movement speed with high contrast, so that the distal end of the device can be extracted with a high reliability degree.

Step S604

An imaging condition adjustment unit 152a of the imaging controller 152 supplies the power to the first X-ray tube 1 from the high-voltage generator 124 at the tube current and the pulse width of the first X-ray tube 1 corresponding to the imaging mode (normal imaging mode or high-speed device imaging mode) taken in step S603, and the tube voltage for which the input is received in step S502.

Step S605

Next, an imaging condition adjustment unit 152a of the imaging controller 152 supplies the power to the second X-ray tube 2 from the high-voltage generator 124 at the tube current and the pulse width of the second X-ray tube 2 corresponding to the imaging mode (normal imaging mode or high-speed device imaging mode) taken in step S603, and the tube voltage for which the input is received in step S502.

In steps S604 and S605, the power is alternately supplied to the first X-ray tube 1 and the second X-ray tube in a pulse waveform of the normal imaging mode of FIG. 5 or the high-speed device imaging mode of FIG. 6, and to alternately irradiate the subject 4 with the X-rays. Therefore, the period in which the first X-ray tube 1 applies the X-rays and the period in which the second X-ray tube 2 applies the X-rays do not overlap with each other.

Step S606

The imaging condition adjustment unit 152a of the imaging controller 152 checks the imaging mode (normal imaging mode or high-speed device imaging mode) input to the imaging condition reception unit 153, the user switches the setting during the execution of steps S603 to S605 in a case in which the checked imaging mode is different from the imaging mode set in immediately previous step S602, and the process returns to step S603 (step S606). In step S603, the imaging condition reception unit 153 reads the pulse width and the tube current of the imaging mode after the switching, and the pulse width and the tube current of the power supplied to the first X-ray tube 1 and the second X-ray tube 2 are adjusted in steps S604 and S605.

In addition, in a case in which the imaging mode (normal imaging mode or high-speed device imaging mode) is not switched in step S606, the process returns to step S604. As a result, in steps S604 and S605, the pulses of the power are supplied to the first X-ray tube 1 and the second X-ray tube 2 at the previous pulse width and tube current.

In steps S601 to S606, the X-rays can be alternately applied from the first X-ray tube 1 and the second X-ray tube 2 at the pulse width and the tube current value corresponding to the normal imaging mode or the high-speed device imaging mode in accordance with the imaging mode and the tube voltage which are input by the user.

Next, an operation of each unit of the operation processing unit 103 of the X-ray imaging apparatus 100 will be described with reference to the flow of FIG. 7.

Step S701

During the irradiation with the X-rays from the first X-ray tube 1, the X-rays transmitted through the subject 4 are detected by the X-ray detector 3, and the data collection unit 154 collects the signal output from the X-ray detector 3 at the timing shown in FIG. 5 or 6.

Step S702

The X-ray image generation unit 141 generates the first X-ray image by using the signal acquired by the data collection unit 154 in step S701.

The X-ray image generation unit 141 displays the generated first X-ray image in the image display region 128 of FIG. 4 on the monitor 122.

An operator inserts the device (catheter or the like) into the subject while viewing the first X-ray image on the monitor 122.

Step S703

The noise image generation unit 144 of the image evaluation unit 140 generates the noise image showing the distribution of noise in the first X-ray image.

Specifically, the noise image generation unit 144 calculates a standard deviation of the pixel values of 8 peripheral pixels (for example, the center (x1,y1) in x direction×y direction=3×3 pixels is defined as any pixel) for the pixel at any position (x1,y1) on the first X-ray image. The noise image is generated by using the calculated standard deviation as a noise value and as the pixel value at any position (x1,y1).

In addition, as another noise image generation method, in step S702, the noise image generation unit 144 obtains, for any frame (for example, tenth frame) of the first X-ray image generated in time series a plurality of times during the pulses of the power supplied to the first X-ray tube, a difference from the immediately previous frame (for example, ninth frame), divides the difference by $\sqrt{2}$, and then calculates a standard deviation of the pixel values of 8 peripheral pixels (for example, the center (x1,y1) in x direction×y direction=3×3 pixels is defined as any pixel) for the pixel at any position. The noise image generation unit 144 may generate the noise image by using the calculated standard deviation as the noise value and as the pixel value at any position (x1,y1).

The noise image generation unit 144 displays the generated noise image in the image display region 128 of FIG. 4 on the monitor 122.

Step S704

The device extraction unit 142 performs image processing on the first X-ray image generated in step S702 to extract the distal end of the device in the first X-ray image.

Specifically, the device extraction unit 142 uses a template matching method in which a template image which is prepared in advance and shows the distal end of the device is used, and a reliability degree indicating a degree of match between images of a plurality of regions set by dividing the first X-ray image and the template image is calculated to search for a region having the highest reliability degree. The region having the highest reliability degree is extracted as the distal end of the device.

Step S705

The device extraction reliability degree calculation unit 145 calculates the reliability degree of the distal end of the device extracted in step S704.

The device extraction reliability degree calculation unit 145 calculates a value indicating a closeness between the image of the distal end of the device extracted by the device extraction unit and the template image by using a known zero-means normalized cross-correlation, and sets the calculated value as the reliability degree. The value having the highest reliability degree is 1.0.

The device extraction reliability degree calculation unit 145 displays the calculated reliability degree on the monitor 122.

Step S706

The three-dimensional position calculation unit 143 calculates a position D1 (real space coordinates) on the X-ray detector 3 onto which the distal end of the device is projected, based on the position of the device extracted in step S704.

Step S707

Figure 8:
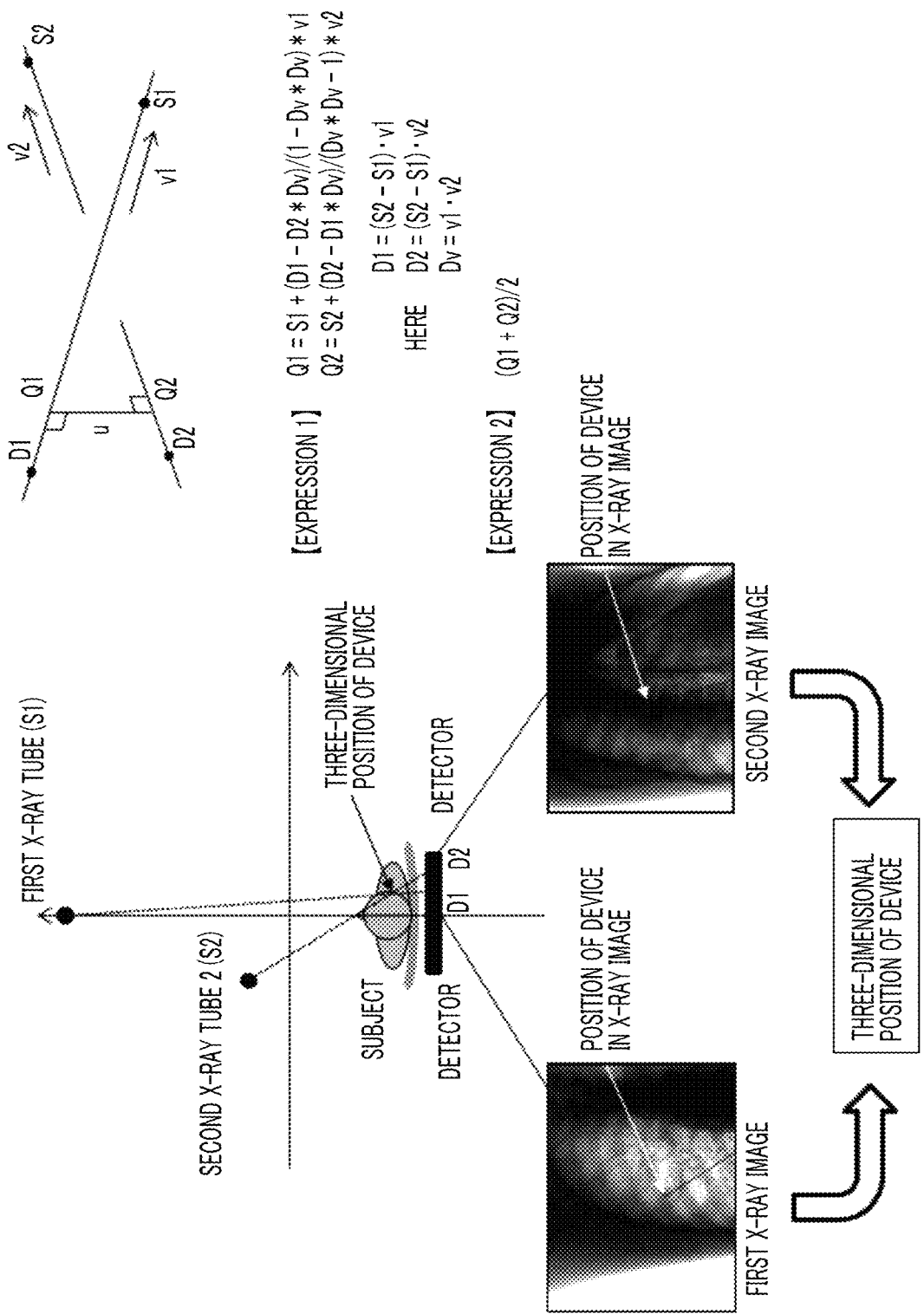
FIG. 8 is a diagram showing a principle that a three-dimensional position calculation unit 143 of the X-ray imaging apparatus 100 according to the embodiment calculates a three-dimensional position of a distal end of the device.

As shown in FIG. 8, the three-dimensional position calculation unit 143 calculates a straight line L1 connecting two points, the position D1 (real space coordinates) of the distal end of the device on the X-ray detector and the position S1 (real space coordinates) of the first X-ray tube 1.

Step S708

On the other hand, during the irradiation with the X-rays from the second X-ray tube 2, the X-rays transmitted through the subject 4 are detected by the X-ray detector 3, and the data collection unit 154 collects the signal output from the X-ray detector 3 at the timing at which a predetermined rate is realized as shown in FIG. 5 or 6.

Step S709

The X-ray image generation unit 141 generates the second X-ray image from the X-rays applied from the second X-ray tube 2 in step S708.

As a result, the operator can check the second X-ray image captured from an angle different from an angle of the first X-ray image on the monitor 122.

The X-ray image generation unit 141 displays the generated second X-ray image in the image display region 128 of FIG. 4 on the monitor 122.

Step S710

The noise image generation unit 144 generates the noise image showing the distribution of noise in the second X-ray image, and displays the generated noise image in the image display region 128 of FIG. 4 on the monitor 122 in the same manner as in step S703.

Step S711

The device extraction unit 142 extracts the distal end of the device in the second X-ray image in the same manner as in step S704.

Step S712

The device extraction reliability degree calculation unit 145 calculates the reliability degree of the distal end of the device extracted in step S711, and displays the calculated reliability degree on the monitor 122.

Step S713

The three-dimensional position calculation unit 143 calculates a position D2 (real space coordinates) on the X-ray detector 3 onto which the distal end of the device is projected, based on the position of the device in the second X-ray image (see FIG. 8).

Step S714

The three-dimensional position calculation unit 143 calculates a straight line L2 connecting two points, the position D2 (real space coordinates) of the distal end of the device on the X-ray detector and the position S2 (real space coordinates) of the second X-ray tube 2 (see FIG. 8).

Step S715

As shown in FIG. 8, the three-dimensional position calculation unit 143 calculates the three-dimensional position of the distal end of the device from a positional relationship between the two straight lines L1 and L2 by using Expressions 1 and 2.

Specifically, a point Q1 on the straight line S1-D1 and a point Q2 on the straight line S2-D2 where the distance between the two straight lines L1 and L2 is closest are obtained, and for example, a midpoint u of the two points is set as the position of the image of the distal end.

The points Q1 and Q2 shown in FIG. 8 can be obtained according to Expression 1.

$$Q1 = S1 + (D1 - D2*Dv)/(1 - Dv*Dv)*v1 \quad (1)$$
$$Q2 = S2 + (D2 - D1*Dv)/(Dv*Dv - 1)*v2$$

Here, $$D1 = (S2 - S1) \cdot v1$$
$$D2 = (S2 - S1) \cdot v2$$
$$Dv = v1 \cdot v2$$

From the three-dimensional positions of the points Q1 and Q2 obtained by Expression 1, the three-dimensional position u of the distal end is calculated by using Expression 2.

$$u = (Q1 + Q2)/2 \quad (2)$$

Step S716

The three-dimensional position calculation unit 143 displays the calculated current three-dimensional position of the distal end of the device on the monitor 122.

Step S717

The operator checks an instruction to continue the imaging, and in a case in which the imaging is to be continued, the process returns to steps S701 and 708 to continue the imaging.

With the X-ray imaging apparatus according to Embodiment 1, it is possible to display the X-ray images captured from two directions, with a compact configuration of two tubes and one detector, without overlapping the detection data of the first X-ray tube and the second X-ray tube in the same imaging time slot and while maintaining the real-time property. Moreover, the image quality can be maintained while reducing the exposure as compared with an apparatus including two tubes and two detectors.

In addition, since the user can switch between the normal imaging mode and the high-speed device imaging mode while viewing the image, the visibility of the device can be maintained even in a case in which the movement speed of the device is high.

Embodiment 2

An X-ray imaging apparatus according to Embodiment 2 will be described.

In Embodiment 1, the user selects the normal imaging mode and the high-speed device imaging mode, but in Embodiment 2, the imaging condition adjustment unit 152a switches the normal imaging mode to the high-speed device imaging mode in a case in which the reliability degree of the extraction of the device is lower than a predetermined reliability degree or in a case in which the calculated movement speed of the device is higher than a predetermined speed.

Figure 9:
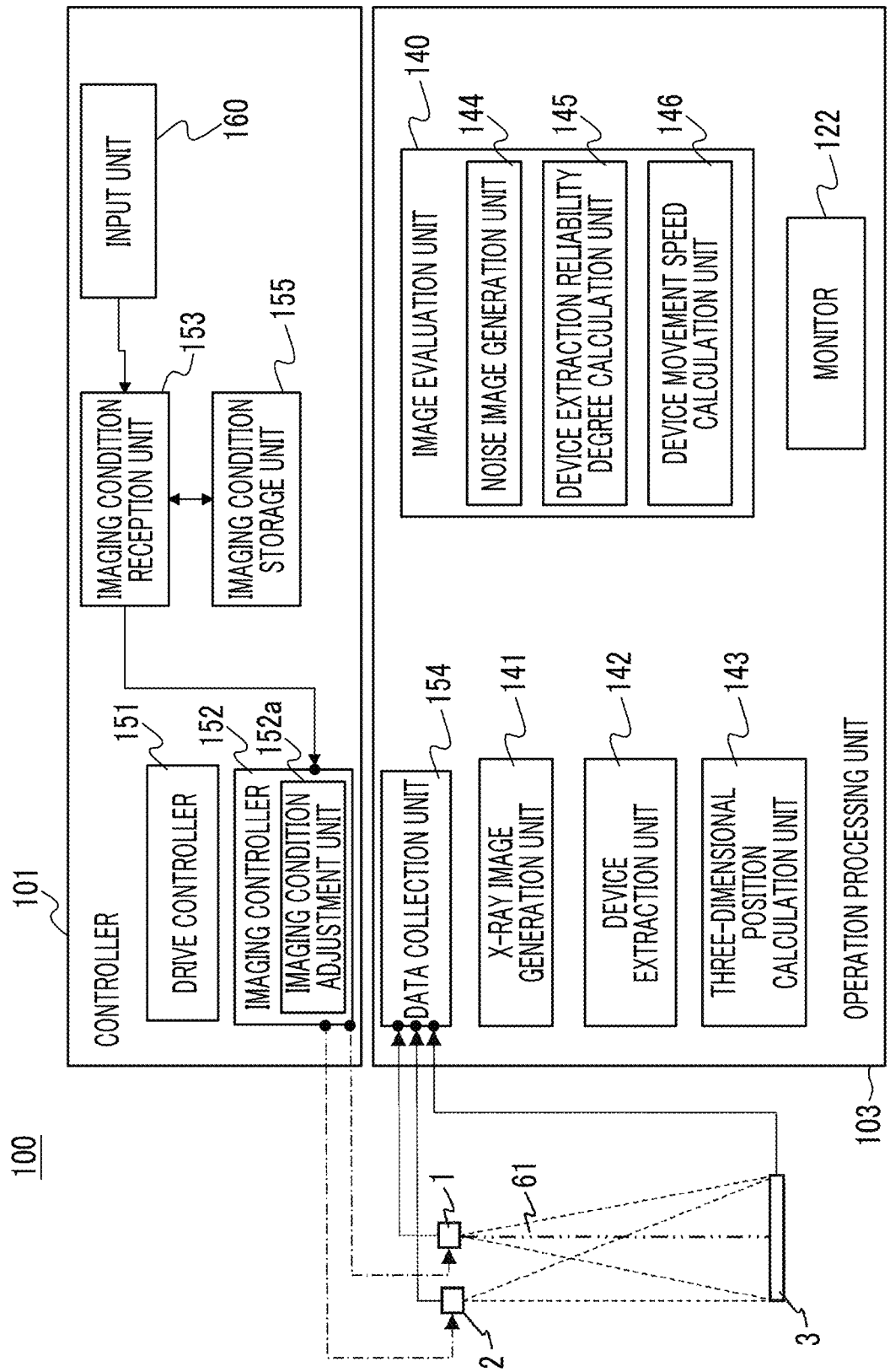
FIG. 9 is a functional block diagram of an X-ray imaging apparatus according to Embodiment 2.
Figure 10:
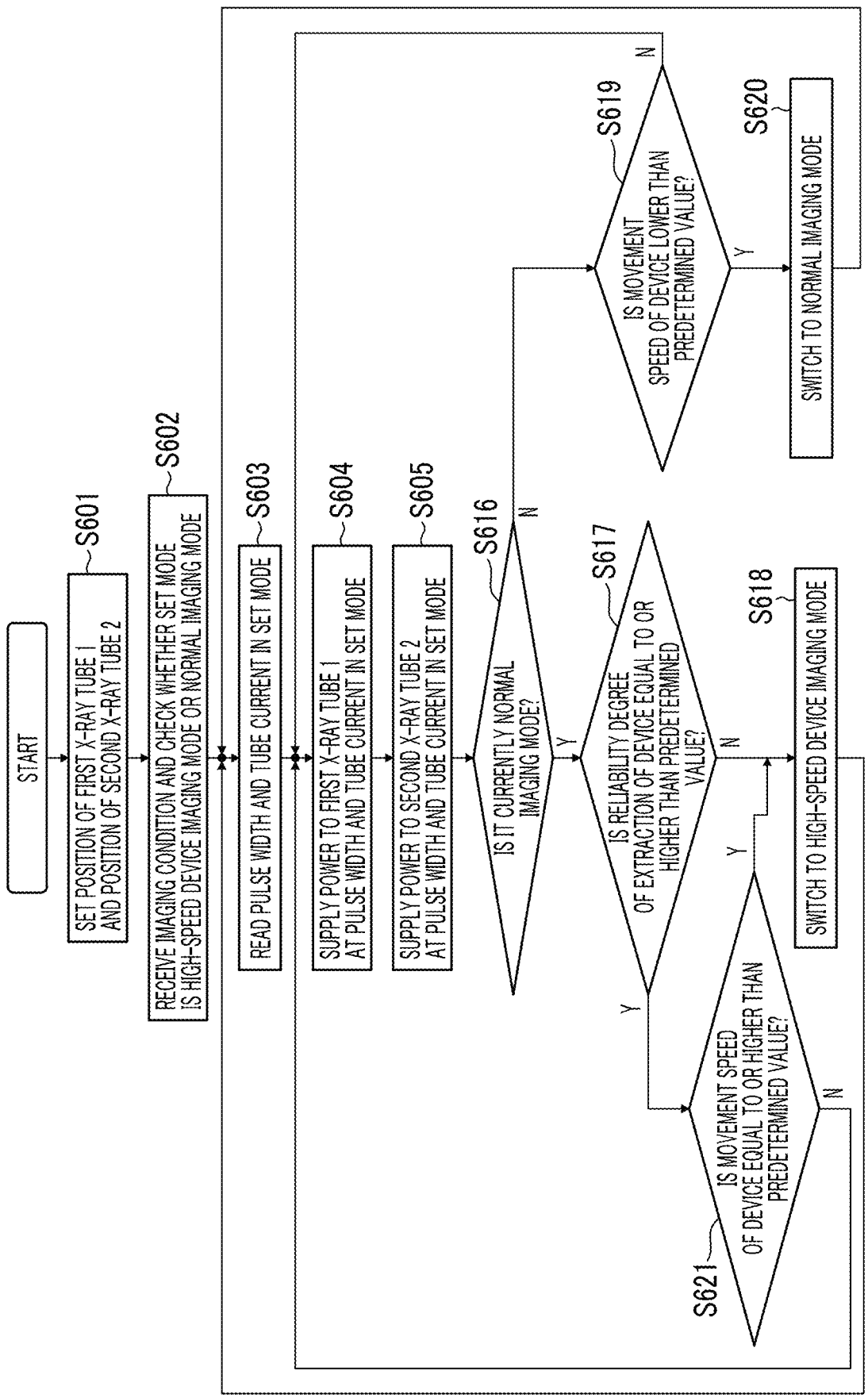
FIG. 10 is a flowchart showing an operation of the controller 101 of the X-ray imaging apparatus according to Embodiment 2.
Figure 11:
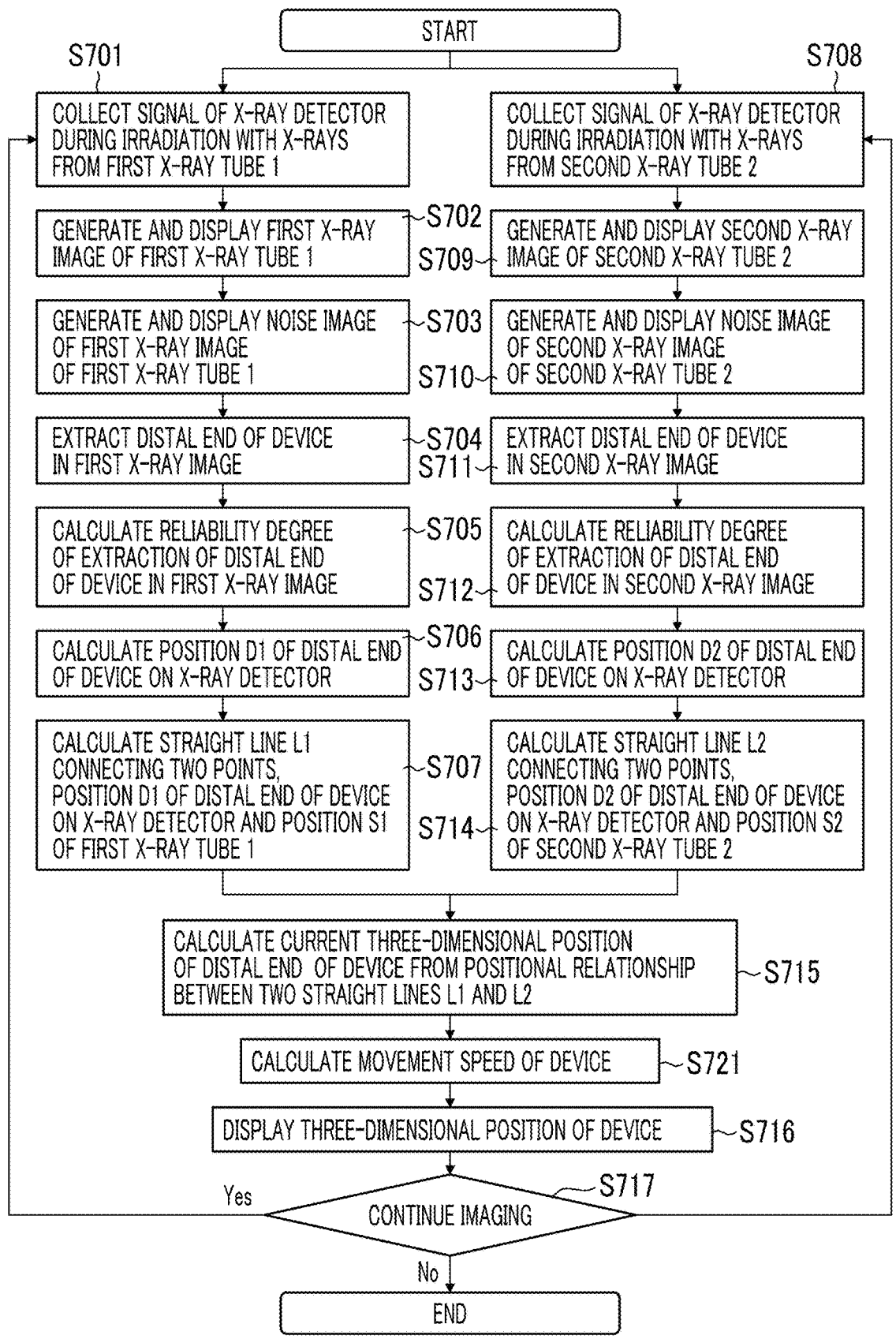
FIG. 11 is a flowchart showing an operation of the operation processing unit 103 of the X-ray imaging apparatus according to Embodiment 2.

FIG. 9 is a functional block diagram of the X-ray imaging apparatus according to Embodiment 2. FIG. 10 is a flowchart showing an operation of the controller 101. FIG. 11 is a flowchart showing an operation of the operation processing unit 103.

As shown in FIG. 9, the X-ray imaging apparatus of Embodiment 2 has the same configuration as the X-ray imaging apparatus 100 of Embodiment 1, but is different from Embodiment 1 in that the image evaluation unit 140 further comprises a device movement speed calculation unit 146.

Step S721

As shown in FIG. 11, in step S721 following step S715, the device movement speed calculation unit 146 calculates the movement speed of the device from a difference between the three-dimensional position of the distal end of the device calculated in step S715 of this case and the three-dimensional position of the distal end of the device calculated in step S715 of previous case.

The steps other than step S721 are the same as the steps in the flow of FIG. 7 of Embodiment 1.

As shown in FIG. 10, each of steps S601 to S605 is the same as each of steps S601 to S605 of the flow of FIG. 3 of Embodiment 1.

Step S616

In step S616 following step S605, the imaging condition adjustment unit 152a checks whether or not the currently set mode is the normal imaging mode, and in a case in which the set mode is the normal imaging mode, the process proceeds to step S617.

Step S617

In step S617, the reliability degree of the extraction of the distal end of the device calculated in each of steps S705 and S712 in the immediately previous operation of the operation processing unit 103 is received from the device extraction reliability degree calculation unit 145, it is determined whether or not the reliability degree is equal to or higher than a predetermined value, and in a case in which at least one reliability degree is lower than the predetermined value, the process proceeds to step S618. In addition, in a case in which the reliability degree is equal to or higher than the predetermined value, the process proceeds to step S621.

Step S618

In step S618, the imaging condition adjustment unit 152a performs switching to the high-speed device imaging mode in order to increase the reliability degree.

Step S621

In step S621, the imaging condition adjustment unit 152a takes in the device movement speed calculated in step S721 by the device movement speed calculation unit 146, and further determines whether or not the movement speed of the device is equal to or higher than a predetermined value.

In a case in which the movement speed of the device is equal to or higher than the predetermined value, the imaging condition adjustment unit 152a proceeds to step S618 to perform switching to the high-speed device imaging mode.

In addition, in a case in which the movement speed of the device is lower than the predetermined value, the imaging condition adjustment unit 152a maintains the imaging mode in the normal imaging mode, returns to step S604, and alternately supplies the power to the first X-ray tube 1 and the second X-ray tube 2 at the pulse width in the normal imaging mode.

On the other hand, in a case in which the mode currently set in step S616 is the high-speed device imaging mode, the imaging condition adjustment unit 152a proceeds to step S619.

Steps S619 and S620

In step S619, the imaging condition adjustment unit 152a takes in the device movement speed, proceeds to step S620 in a case in which the device movement speed is lower than the predetermined value, switches the imaging mode to the normal imaging mode, returns to step S603, and switches the pulse width and the tube current to the pulse width and the like in the normal imaging mode.

On the other hand, in step S619, in a case in which the movement speed of the device is equal to or higher than the predetermined value, the imaging condition adjustment unit 152a returns to step S604 to continue the imaging while maintaining the high-speed device imaging mode.

As a result, the X-ray imaging apparatus according to Embodiment 2 can automatically switch the imaging mode depending on the extracted movement speed of the device and the reliability degree of the extraction.

Figure 12:
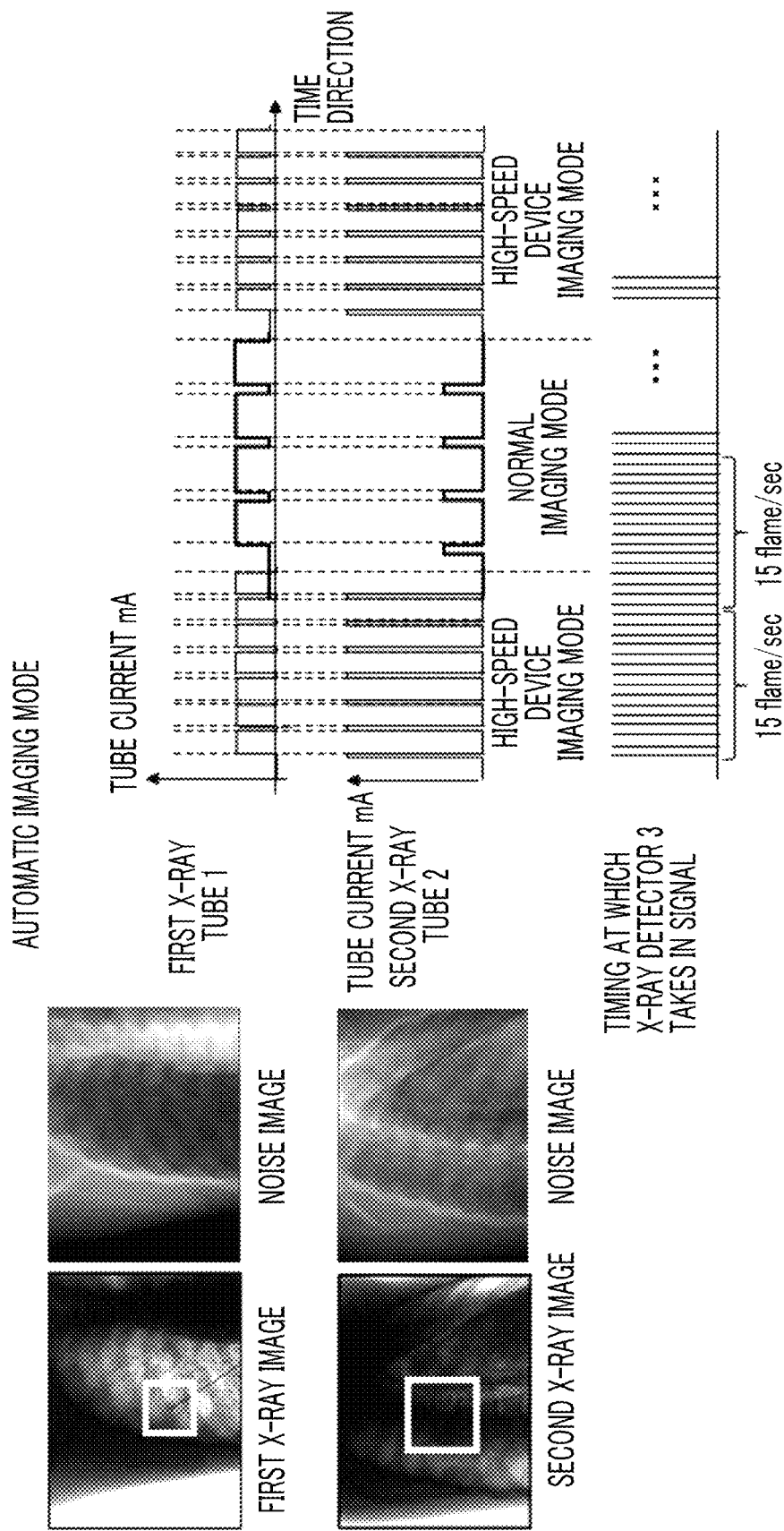
FIG. 12 is a diagram showing a time-series change in a pulse shape of power supplied to the first X-ray tube 1 and the second X-ray tube 2 of the X-ray imaging apparatus according to Embodiment 2, a timing at which the operation processing unit 103 takes in a signal from the X-ray detector 3, first and second X-ray images, and a noise image.

Therefore, the pulse width of the power supplied to the first X-ray tube 1 and the second X-ray tube 2 is changed in time series as shown in FIG. 12 each time the mode is switched.

In the X-ray imaging apparatus according to Embodiment 2, the imaging mode is switched to a suitable mode by the imaging condition adjustment unit 152a, so that it is possible to achieve the effect that the optimum imaging mode can be set without bothering the user, in addition to the effects described in Embodiment 1.

Embodiment 3

An X-ray imaging apparatus according to Embodiment 3 will be described with reference to FIGS. 13 to 15.

Figure 13:
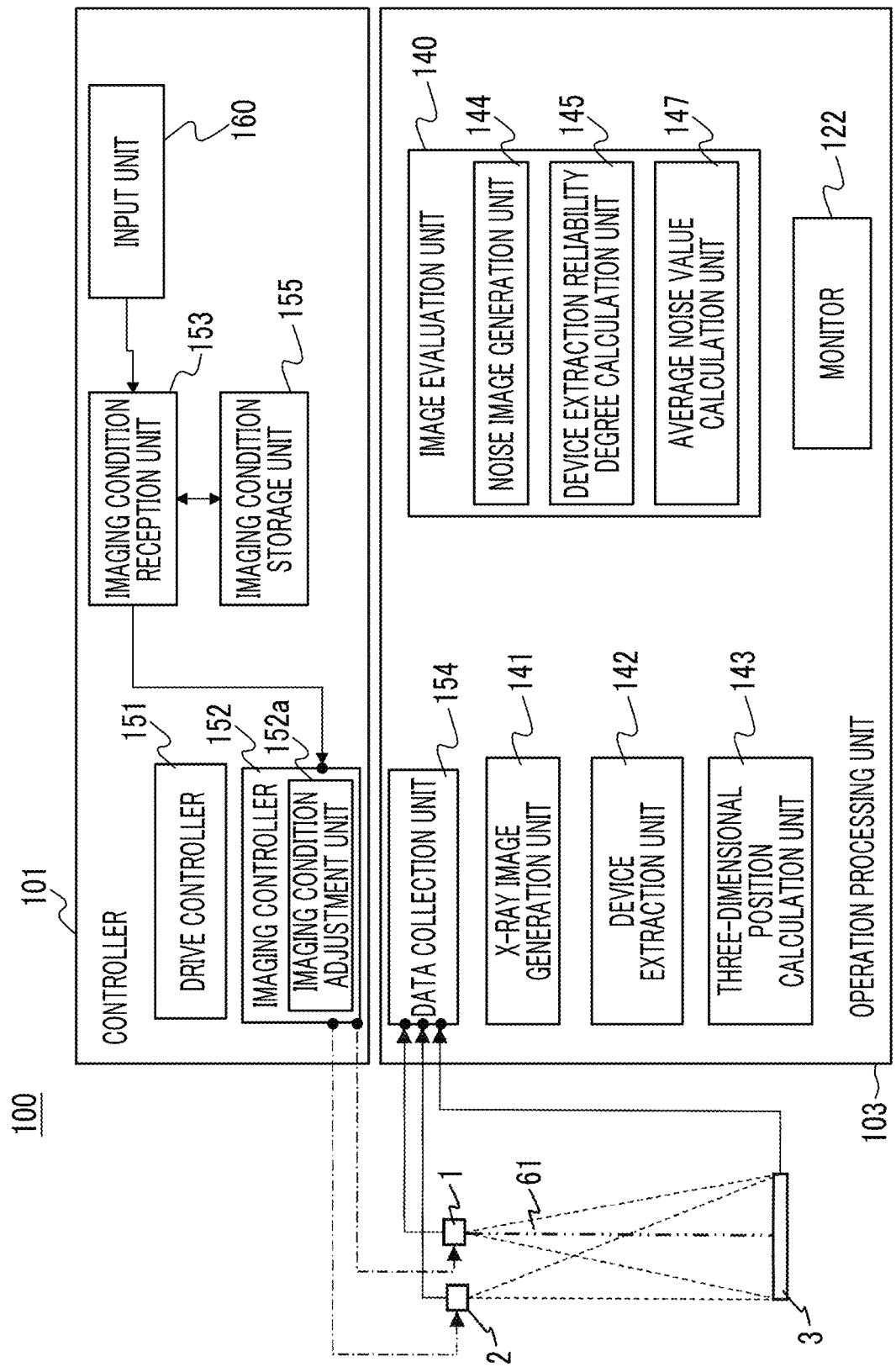
FIG. 13 is a functional block diagram of an X-ray imaging apparatus according to Embodiment 3.

FIG. 13 is a functional block diagram of the X-ray imaging apparatus according to Embodiment 3. FIG. 14 is a flowchart showing an operation of the controller 101 of the X-ray imaging apparatus according to Embodiment 3. FIG. 15 is a diagram showing that the reliability degrees of the first X-ray image and the second X-ray image are increased by moving the second X-ray tube 2.

In the X-ray imaging apparatus of Embodiment 3, as shown in FIG. 13, the image evaluation unit 140 comprises an average noise value calculation unit 147. The average noise value calculation unit 147 calculates an average noise value for the second X-ray image. For example, the average noise value calculation unit 147 calculates the average noise value by obtaining an average value of the pixel values of the noise images of the second X-ray image generated by the noise image generation unit 144.

In addition, the second support portion 7 that supports the second X-ray tube 2 comprises a moving mechanism that moves the position of the second X-ray tube 2 with respect to the first X-ray tube 1 in a predetermined direction. An operation of the moving mechanism is controlled by the mechanism controller 123.

Figure 14:
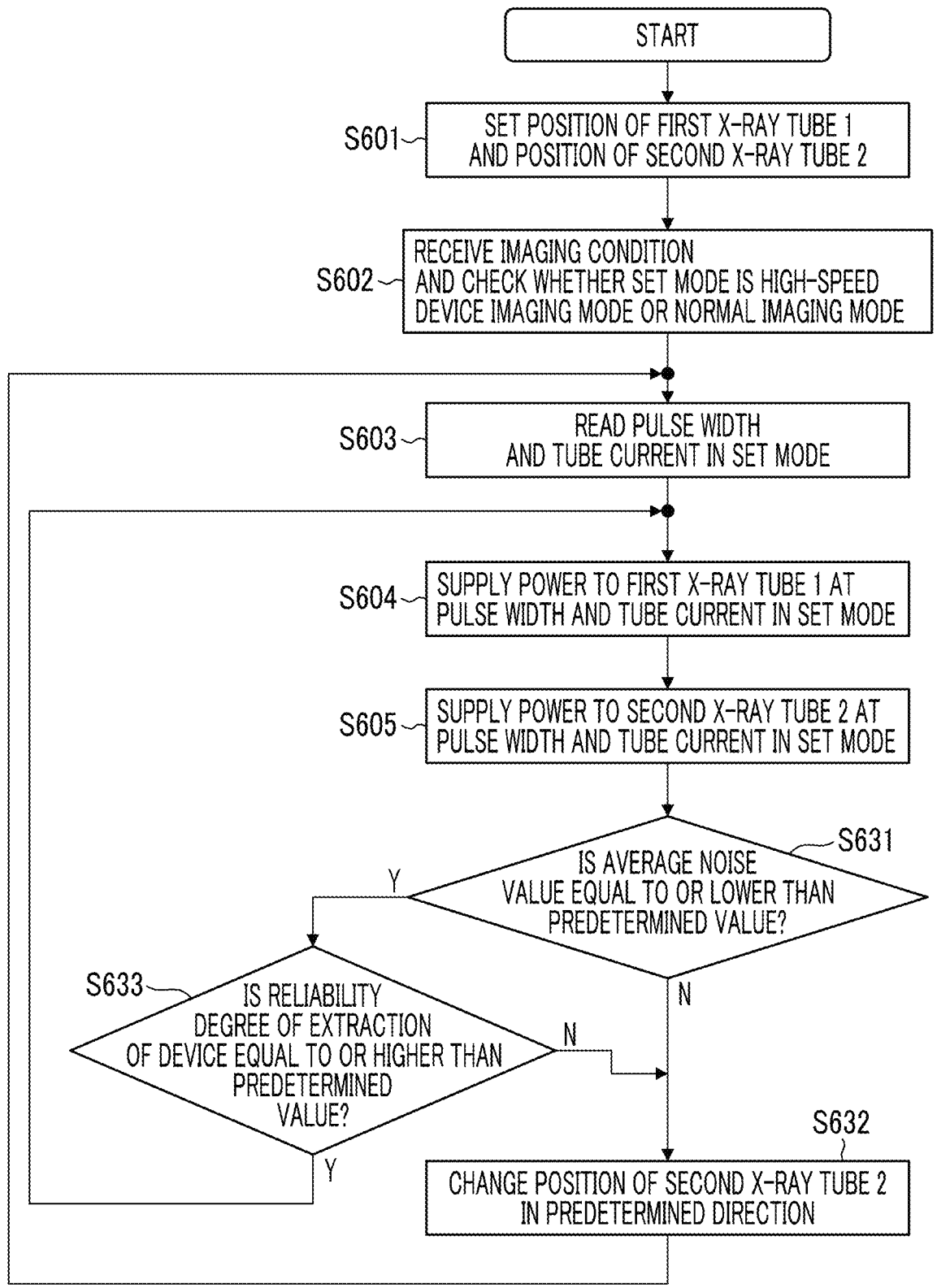
FIG. 14 is a flowchart showing an operation of the controller 101 of the X-ray imaging apparatus according to Embodiment 3.

As shown in FIG. 14, after the controller 101 of the X-ray imaging apparatus executes steps S601 to S605 in the same manner as in Embodiment 1, in step S631, the imaging condition adjustment unit 152a receives the average noise value recently calculated by the average noise value calculation unit 147, and determines whether or not the average noise value is equal to or lower than the predetermined value. In a case in which the average noise value is higher than the predetermined value, the process proceeds to step S632, the imaging condition adjustment unit 152a causes the mechanism controller 123 to operate the moving mechanism to move the position of the second X-ray tube 2 by a predetermined amount. For example, as shown in FIG. 15, the second X-ray tube 2 is moved by expanding and contracting the second support portion 7.

Figure 15:
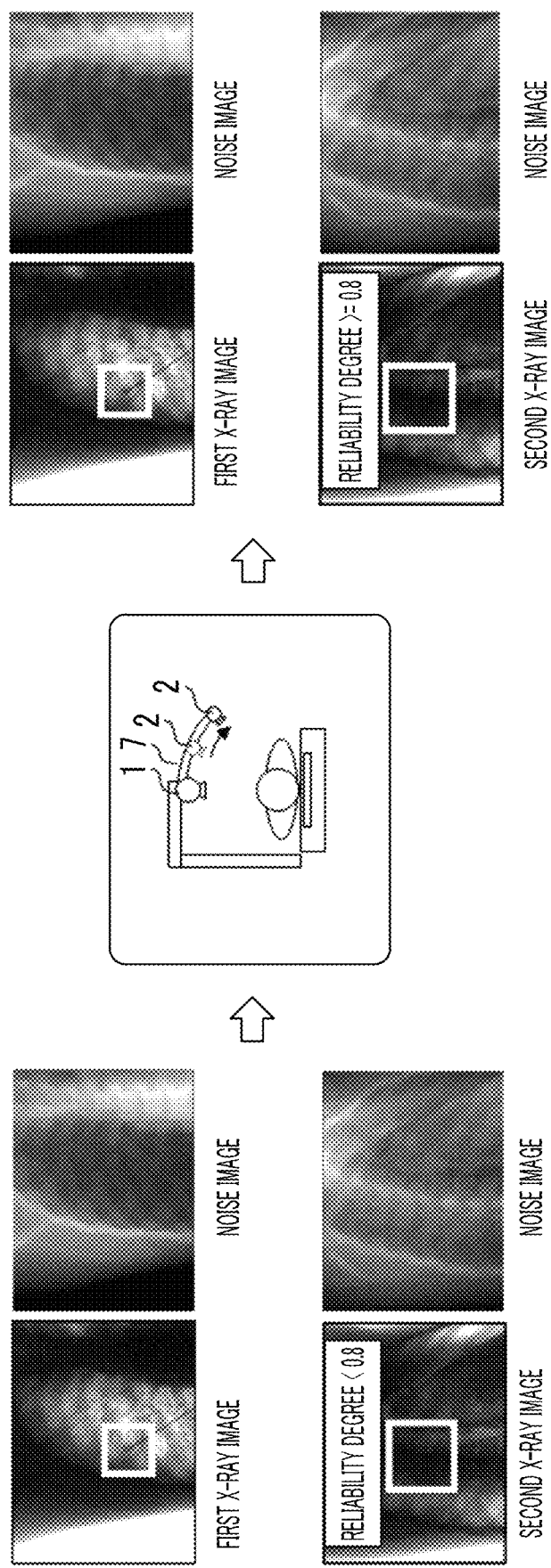
FIG. 15 is a diagram showing that reliability degrees of a first X-ray image and a second X-ray image are increased by moving the second X-ray tube 2 of the X-ray imaging apparatus according to Embodiment 3.

As a result, as shown in FIG. 15, the subject 4 can be irradiated with the X-rays from the second X-ray tube 2 at a position different from a position before the movement. Therefore, for example, in the second X-ray image, a state in which the noise amount is increased due to the reason that the bone and the device overlap with each other, to reduce the reliability degree of the extraction of the device is improved, and the noise amount of the second X-ray image can be reduced and the reliability degree of the extraction of the device can be improved.

The configurations in Embodiment 3 other than the above-described configuration are the same as the configurations in Embodiment 1, and thus the description thereof will be omitted.

The moving mechanism of the second X-ray tube 2 is not limited to the mechanism of expanding and contracting the second support portion 7 as shown in FIG. 15, and a mechanism that cause the second X-ray tube 2 to move rotationally about an optical axis 61 of the first X-ray tube 1 may be adopted.

Figure 16B:
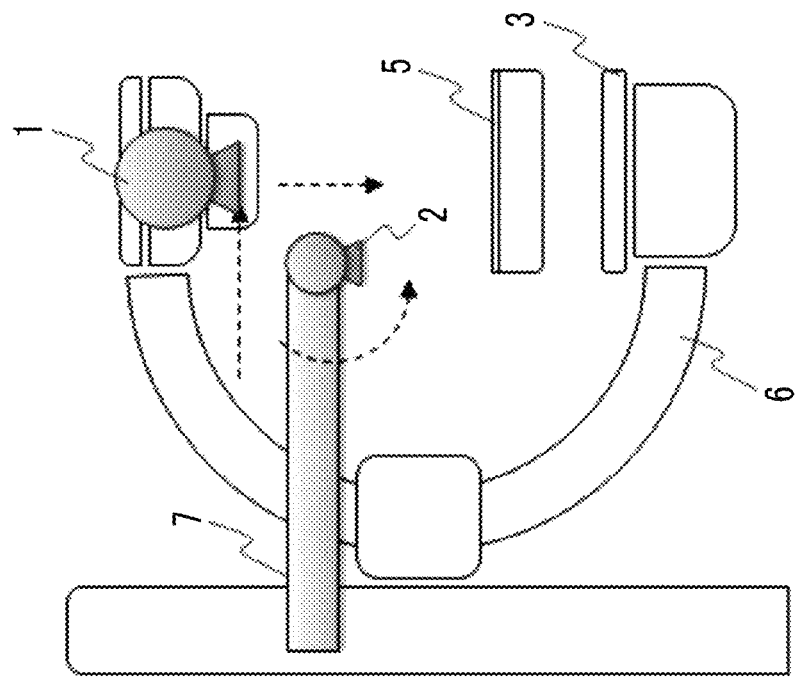
FIGS. 16A and 16B are diagrams showing a structural example of a first support portion 6 of the first X-ray tube 1 of the X-ray imaging apparatus according to Embodiment 3, and a movement direction of the second X-ray tube 2.
Figure 16A:
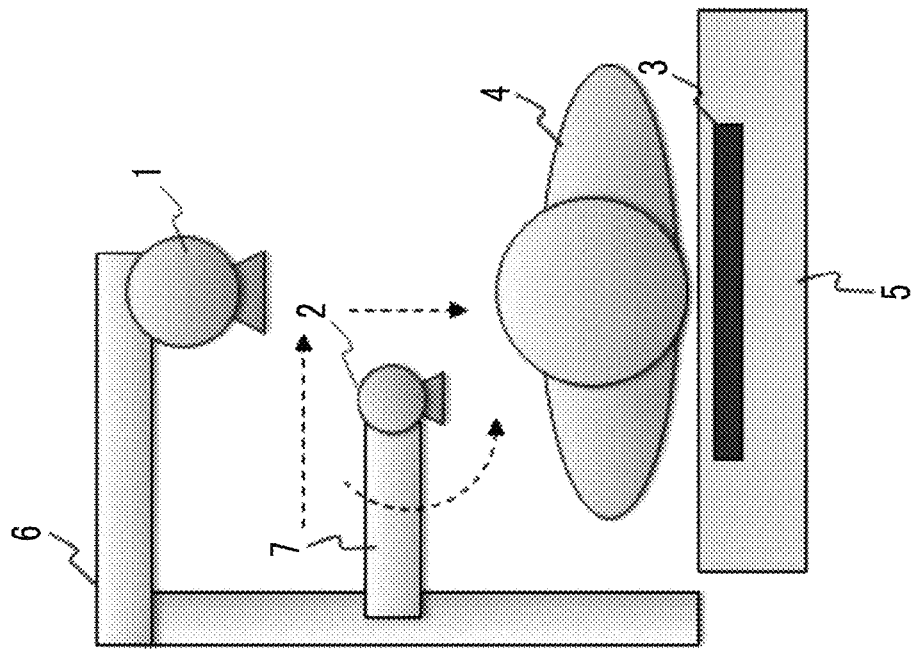

In addition, as shown in FIG. 16A, the second support portion 7 may be supported by a column portion of the first support portion 6 that supports the first X-ray tube 1. The moving mechanism of the second X-ray tube 2 may be a moving mechanism that moves the second X-ray tube 2 up and down and moves the second X-ray tube 2 in a direction of being close to or away from the subject 4, a moving mechanism that moves the second X-ray tube 2 to the width of the top plate (width direction of a body of the subject 4), or a moving mechanism that causes the second X-ray tube 2 to move rotationally about an axis parallel to a body axis of the subject 4.

Further, as shown in FIG. 16B, a configuration may be adopted in which the first support portion 6 that supports the first X-ray tube 1 is a C-type arm, and the second support portion 7 is supported by a column portion that supports the rotation center of the first support portion 6 as the C-type arm. In this case, the moving mechanism of the second X-ray tube 2 may be a moving mechanism that moves the second X-ray tube 2 in a direction of being close to or away from the subject 4 while avoiding the contact with the C-type arm, a moving mechanism that moves the second X-ray tube 2 to the width of the top plate (width direction of a body of the subject 4), or a moving mechanism that causes the second X-ray tube 2 to move rotationally about an axis parallel to a body axis of the subject 4.

Embodiment 4

An X-ray imaging apparatus according to Embodiment 4 will be described with reference to FIGS. 17 to 19. The X-ray imaging apparatus according to Embodiment 4 has a 3D mapping function of generating a two-dimensional projection image in a direction desired by the operator from a three-dimensional image captured in advance by a CT apparatus, an MRI apparatus, or the like, and displaying the position of the distal end of the device on the generated two-dimensional projection image.

Since other configurations of the X-ray imaging apparatus 100 are the same as the configurations in Embodiment 1, the description of the same configurations and the same operations as the configurations and operations of Embodiment 1 will be omitted.

Figure 17:
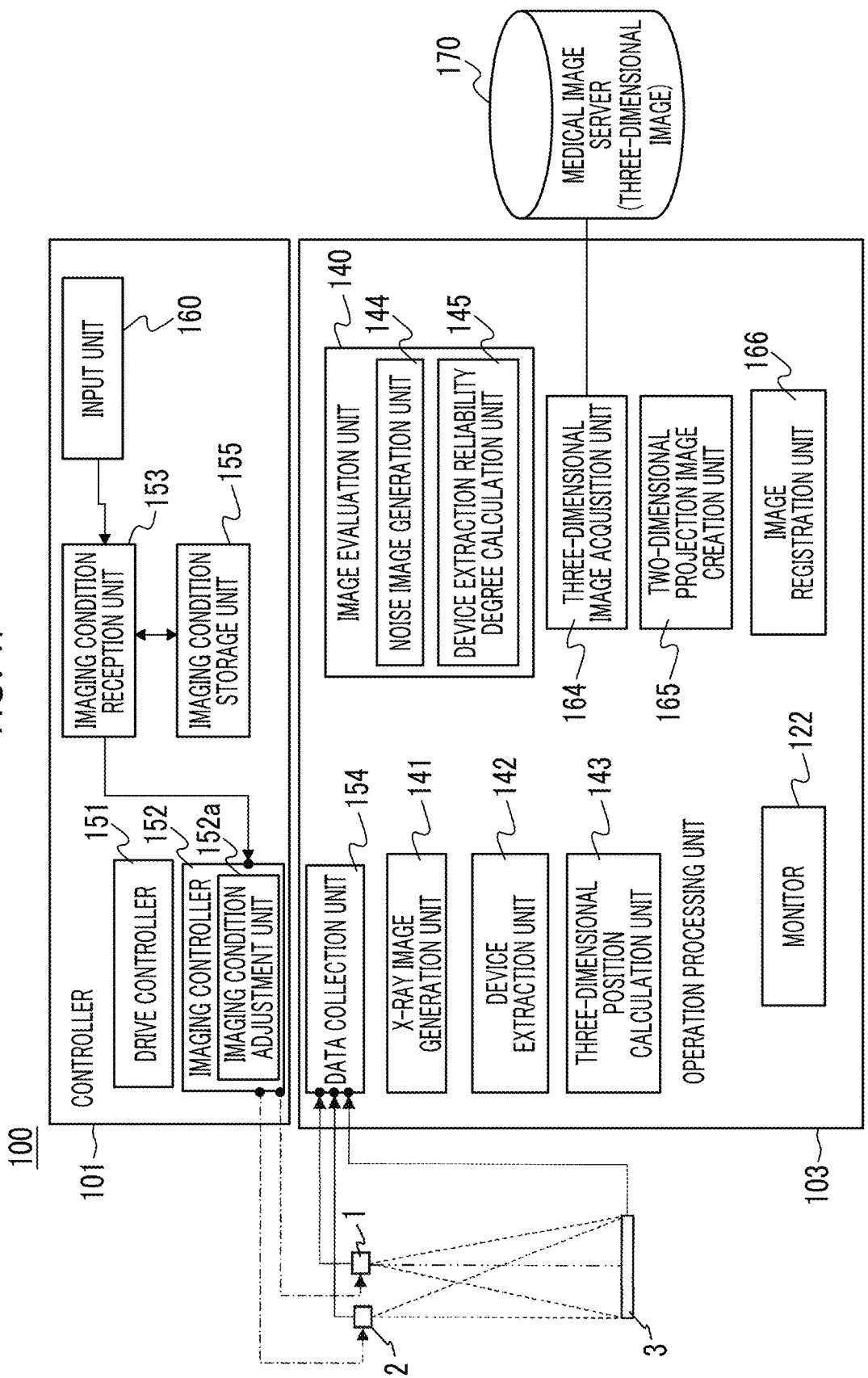
FIG. 17 is a functional block diagram of an X-ray imaging apparatus according to Embodiment 4.

FIG. 17 is a block diagram showing a configuration of main units of the X-ray imaging apparatus 100 according to Embodiment 4. FIG. 18 is a flow showing an operation of the operation processing unit 103. In FIG. 18, steps S801 to S808 of projecting a pre-captured three-dimensional image to generate a two-dimensional projection image are provided. FIG. 19 shows an example of a screen displayed in the image display region 128. FIG. 20 is a diagram showing a principle of 3D mapping.

The X-ray imaging apparatus 100 has substantially the same configuration as the X-ray imaging apparatus 100 according to Embodiment 1, but has a difference from Embodiment 1 in that a three-dimensional image acquisition unit 164, a two-dimensional projection image creation unit 165, and an image registration unit 166 are provided in the operation processing unit 103. The three-dimensional image acquisition unit 164 is connected to an external medical image server 170. The medical image server 170 stores a three-dimensional image of the subject 4 captured in advance by the CT apparatus or the MRI apparatus.

An operation of the operation processing unit of the X-ray imaging apparatus 100 will be described with reference to the flow of FIG. 18.

Figure 18:
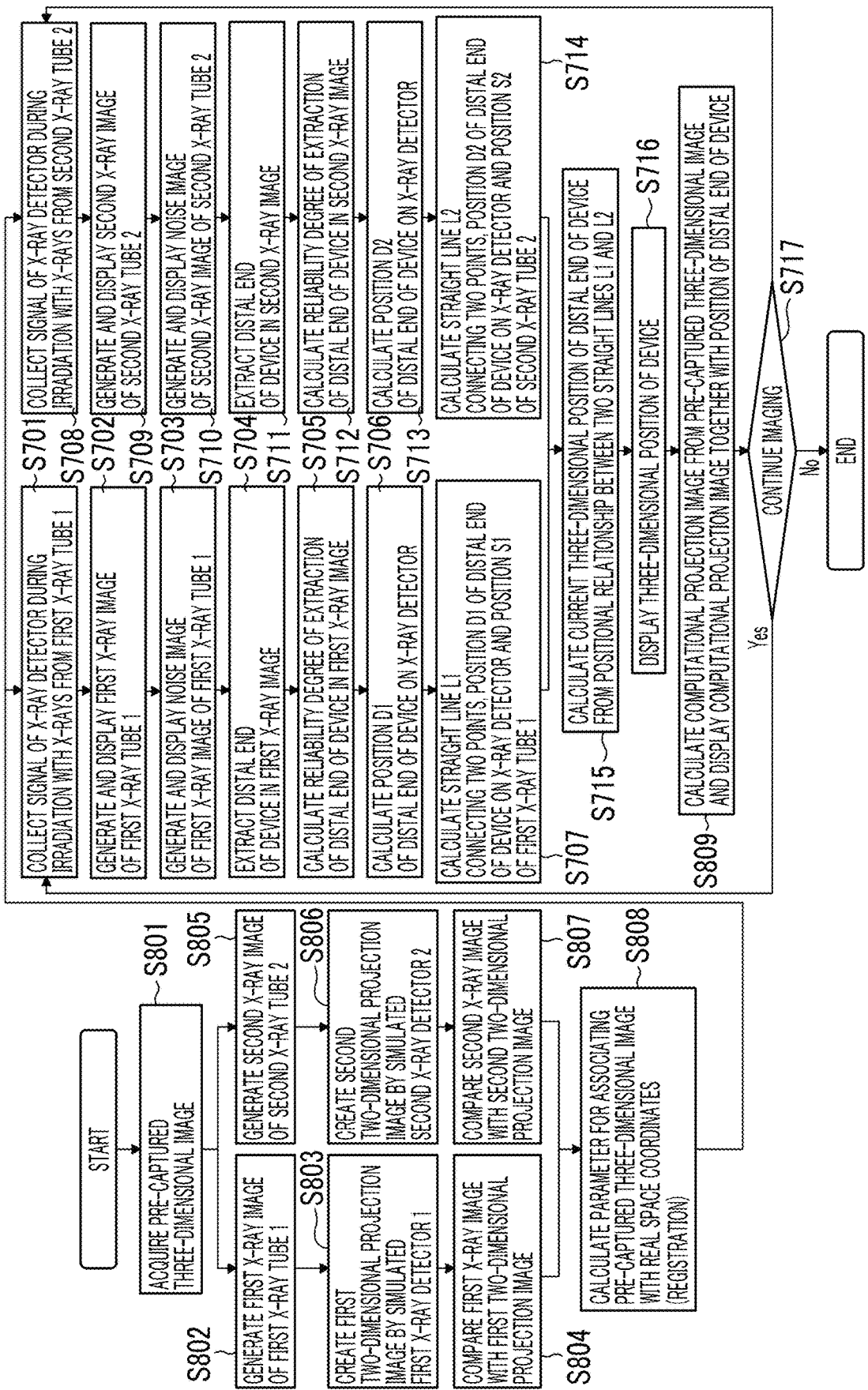
FIG. 18 is a flowchart showing an operation of the operation processing unit 103 of the X-ray imaging apparatus according to Embodiment 4.

The flow of FIG. 18 is a configuration in which steps S801 to S809 are added to the flow of FIG. 7 of Embodiment 1.
Step S801
First, the three-dimensional image acquisition unit 164 acquires the three-dimensional image captured in advance for the subject 4 from the medical image server 170.
Step S802
Next, in a state in which the position setting of the first X-ray tube 1 and the second X-ray tube 2 in step S601 of the flow of FIG. 3 ends by the controller 101, the subject 4 is irradiated with the X-rays from the first X-ray tube 1. The X-ray image generation unit 141 generates the first X-ray image.

Step S803

As shown in (a) of FIG. 20, the two-dimensional projection image creation unit 165 disposes a simulated first X-ray tube 1 and a simulated X-ray detector 3 with respect to the pre-captured three-dimensional image at the same position as the positional relationship between the first X-ray tube 1 and the X-ray detector 3 in step S802, projects the pre-captured three-dimensional image onto the simulated X-ray detector 3, and calculate a first two-dimensional projection image.

Step S804

As shown in (b) of FIG. 20, the image registration unit 166 compares the first X-ray image acquired in step S802 with the first two-dimensional projection image calculated in step S803. In a case in which the first X-ray image and the first two-dimensional projection image are different from each other, the position of the pre-captured three-dimensional image with respect to the simulated first X-ray tube 1 and the simulated X-ray detector 3 is changed, the first two-dimensional projection image is calculated again, and the comparison with the first X-ray image acquired in step S802 is performed. The comparison is repeated until the first X-ray image acquired in step S802 and the first two-dimensional projection image calculated in step S803 match.

Step S805

Next, the subject 4 is irradiated with the X-rays from the second X-ray tube 2 and the X-ray image generation unit 141 acquires the second X-ray image.

Step S806

As shown in (a) of FIG. 20, the two-dimensional projection image creation unit 165 disposes a simulated second X-ray tube 2 and the simulated X-ray detector 3 with respect to the pre-captured three-dimensional image at the same position as the positional relationship between the second X-ray tube 2 and the X-ray detector 3 in step S805, projects the pre-captured three-dimensional image onto the simulated X-ray detector 3 and calculate a second two-dimensional projection image.

Step S807

As shown in (c) of FIG. 20, the image registration unit 166 compares the second X-ray image acquired in step S805 with the second two-dimensional projection image calculated in step S806. In a case in which the second X-ray image and the second two-dimensional projection image are different from each other, the position of the pre-captured three-dimensional image with respect to the simulated second X-ray tube 2 and the simulated X-ray detector 3 is changed, the second two-dimensional projection image is calculated again, and the comparison with the second X-ray image acquired in step S805 is performed. The comparison is repeated until the second X-ray image acquired in step S805 and the second two-dimensional projection image calculated in step S806 match.

Step S808

The image registration unit 166 calculates a parameter for associating the coordinate system of the pre-captured three-dimensional image with the real space coordinates from the position of the pre-captured three-dimensional image with respect to the simulated first X-ray tube 1 and the simulated X-ray detector 3 in a case in which the first X-ray image acquired in step S802 and the first two-dimensional projection image calculated in step S803 match (registration). Similarly, the image registration unit 166 calculates a parameter for associating the coordinate system of the pre-captured three-dimensional image with the real space coordinates from the position of the pre-captured three-dimensional image with respect to the simulated second X-ray tube 2 and the simulated X-ray detector 3 in a case in which the second X-ray image acquired in step S805 and the second two-dimensional projection image calculated in step S806 match (registration). Here, since the parameter obtained from the first X-ray image and the parameter obtained from the second X-ray image are obtained, a parameter for associating the coordinate system of the pre-captured three-dimensional image with the real space coordinates is obtained by selecting any one of the parameters or obtaining an average.

Steps S701 to S716

Steps S701 to S716 are executed in the same manner as in Embodiment 1, and the current three-dimensional position of the distal end of the device is calculated and displayed on the monitor 122. As a display method, for example, as shown in an image 1902 of FIG. 19, the display is performed in a frame that images a three-dimensional space.

Step S809

Figure 19:
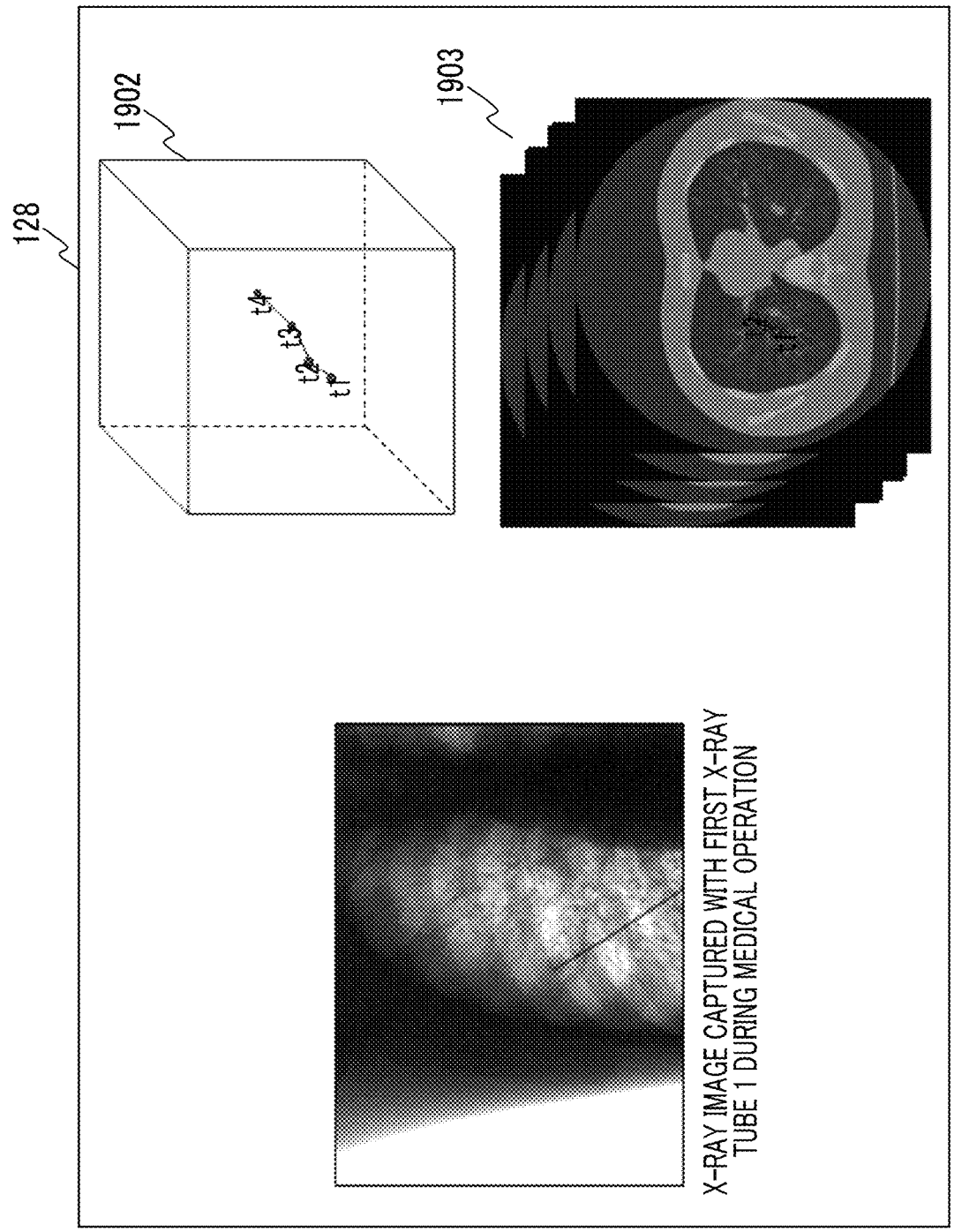
FIG. 19 is a diagram showing an example of a screen displayed in an image display region 128 of a monitor 122 of the X-ray imaging apparatus according to Embodiment 4.

The pre-captured three-dimensional image is converted into the real space coordinates by using the parameter for associating the coordinate system of the pre-captured three-dimensional image obtained in step S808 with the real space coordinates, and then the two-dimensional projection is performed in a direction desired by the operator to calculate a computational projection image 1903 as shown in FIG. 19. The position of the distal end of the device calculated in step S715 is overlapped on the calculated computational projection image 1903, and is displayed as shown in FIG. 19.

With the X-ray imaging apparatus according to Embodiment 4, the position of the distal end of the device recognized in real time can be shown on the two-dimensional projection image obtained by projecting the pre-captured three-dimensional image in the direction designated by the operator, and the correspondence between the position of the distal end of the device and the anatomical structure of the subject can be easily understood.

EXPLANATION OF REFERENCES

61: optical axis
100: X-ray imaging apparatus
101: controller
102: main body
103: operation processing unit
111: keyboard
112: mouse
113: memory
114: central processing unit
115: HDD device
116: detector controller
117: X-ray controller
119: memory
120: central processing unit
121: HDD device
122: monitor
123: mechanism controller
124: high-voltage generator
125: imaging mode reception region
126: target parameter input region
127: imaging condition input region
128: image display region
140: image evaluation unit
141: X-ray image generation unit
142: device extraction unit
143: three-dimensional position calculation unit
144: noise image generation unit 145: device extraction reliability degree calculation unit
146: device movement speed calculation unit
147: average noise value calculation unit
151: drive controller
152: imaging controller
152a: imaging condition adjustment unit
153: imaging condition reception unit
154: data collection unit
155: imaging condition storage unit
160: input unit
164: three-dimensional image acquisition unit
165: two-dimensional projection image creation unit
166: image registration unit
170: medical image server
1902: image
1903: computational projection image

What is claimed is:

1. An X-ray imaging apparatus comprising:
a top plate on which a subject is placed;
a first X-ray tube that irradiates the subject with X-rays;
a second X-ray tube that irradiates the subject with X-rays from a direction different from a direction of the first X-ray tube;
one X-ray detector that detects the X-rays that are applied from the first X-ray tube and the second X-ray tube and are transmitted through the subject;
an imaging controller; and
an image generation unit,
wherein the imaging controller alternately supplies pulse-like power to the first X-ray tube at a first pulse width and to the second X-ray tube at a second pulse width such that a period in which the first X-ray tube applies the X-rays and a period in which the second X-ray tube applies the X-rays do not overlap with each other, and
the image generation unit generates a first X-ray image by taking in output of the X-ray detector that has detected the X-rays applied from the first X-ray tube, and generates a second X-ray image by taking in output of the X-ray detector that has detected the X-rays applied from the second X-ray tube.

2. The X-ray imaging apparatus according to claim 1,
wherein the first pulse width at which the imaging controller supplies the power to the first X-ray tube is larger than the second pulse width at which the imaging controller supplies the power to the second X-ray tube, and
the image generation unit generates a plurality of time-series images at a predetermined frame rate by taking in the output of the X-ray detector a plurality of times at a predetermined rate while the first X-ray tube applies the X-rays by the power supplied at the first pulse width.

3. The X-ray imaging apparatus according to claim 2,
wherein the imaging controller includes an imaging condition adjustment unit, and
the imaging condition adjustment unit has a normal imaging mode and a high-speed device imaging mode, which are determined in advance, and in the normal imaging mode and the high-speed device imaging mode, at least one of the first pulse width at which the power is supplied to the first X-ray tube or a tube current value of a pulse at which the power is supplied to the second X-ray tube is changed.

4. The X-ray imaging apparatus according to claim 3,
wherein the first pulse width in the high-speed device imaging mode is set to be smaller than the first pulse width in the normal imaging mode.

5. The X-ray imaging apparatus according to claim 3,
wherein the tube current value of the pulse at which the power is supplied to the second X-ray tube in the high-speed device imaging mode is set to be higher than the tube current value of the pulse at which the power is supplied to the second X-ray tube in the normal imaging mode.

6. The X-ray imaging apparatus according to claim 3, further comprising:
an input unit that receives a setting of whether an imaging mode is set to the normal imaging mode or the high-speed device imaging mode from a user,
wherein the imaging condition adjustment unit switches between the normal imaging mode and the high-speed device imaging mode in accordance with the imaging mode set in the input unit.

7. The X-ray imaging apparatus according to claim 3, further comprising:
a device extraction unit that extracts an image of a device in the subject by using the first X-ray image and the second X-ray image, the image being included in the first X-ray image and the second X-ray image; and
a movement speed calculation unit that calculates a movement speed of the device in the subject,
wherein the imaging condition adjustment unit switches the normal imaging mode to the high-speed device imaging mode in a case in which the movement speed of the device calculated by the movement speed calculation unit is higher than a predetermined speed.

8. The X-ray imaging apparatus according to claim 3, further comprising:
a device extraction unit that extracts an image of a device in the subject by using the first X-ray image and the second X-ray image, the image being included in the first X-ray image and the second X-ray image; and
a reliability degree calculation unit that calculates a reliability degree of the extraction of the image of the device by the device extraction unit,
wherein the imaging condition adjustment unit switches the normal imaging mode to the high-speed device imaging mode in a case in which the reliability degree calculated by the reliability degree calculation unit is lower than a predetermined reliability degree.

9. The X-ray imaging apparatus according to claim 2, further comprising:
an average noise value calculation unit that calculates an average noise value for the second X-ray image; and
a moving mechanism that moves a position of the second X-ray tube with respect to the first X-ray tube in a predetermined direction,
wherein the imaging controller includes an imaging condition adjustment unit, and
the imaging condition adjustment unit instructs the moving mechanism to move the position of the second X-ray tube in a case in which the average noise value calculated by the average noise value calculation unit is higher than a predetermined value.

10. An operation method of an X-ray imaging apparatus including a top plate on which a subject is placed, a first X-ray tube that irradiates the subject with X-rays, a second X-ray tube that irradiates the subject with X-rays from a direction different from a direction of the first X-ray tube, and an X-ray detector that detects the X-rays that are applied from the first X-ray tube and the second X-ray tube and are transmitted through the subject, the operation method comprising:

alternately supplying pulse-like power to the first X-ray tube at a first pulse width and to the second X-ray tube at a second pulse width such that a period in which the first X-ray tube applies the X-rays and a period in which the second X-ray tube applies the X-rays do not overlap with each other; and generating a first X-ray image by taking in output of the X-ray detector that has detected the X-rays applied from the first X-ray tube, and generating a second X-ray image by taking in output of the X-ray detector that has detected the X-rays applied from the second X-ray tube.

\* \* \* \* \*